(12) United States Patent
Murakami

(10) Patent No.: US 6,629,854 B2
(45) Date of Patent: Oct. 7, 2003

(54) STRUCTURE OF WIRING CONNECTION

(75) Inventor: Yoshinori Murakami, Tokyo (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/903,759

(22) Filed: Jul. 13, 2001

(65) Prior Publication Data

US 2002/0025709 A1 Feb. 28, 2002

(30) Foreign Application Priority Data

Jul. 13, 2000 (JP) .................................... P2000-212467

(51) Int. Cl.⁷ .............................................. H01R 13/64
(52) U.S. Cl. ........................................ 439/251; 439/212
(58) Field of Search ............................... 439/251, 889, 439/212, 213; 174/88 B

(56) References Cited

U.S. PATENT DOCUMENTS

| | | | | |
|---|---|---|---|---|
| 2,914,708 A | * | 11/1959 | Edmunds | 439/212 |
| 3,339,009 A | * | 8/1967 | Davis et al. | 439/212 |
| 4,752,233 A | * | 6/1988 | Morby et al. | 439/212 |
| 5,132,896 A | | 7/1992 | Nishizawa et al. | 363/144 |
| 5,172,310 A | | 12/1992 | Deam et al. | 363/144 |
| 6,024,589 A | * | 2/2000 | Hahn et al. | 439/212 |

* cited by examiner

*Primary Examiner*—Lynn Field
*Assistant Examiner*—Hae Moon Hyeon
(74) *Attorney, Agent, or Firm*—McDermott, Will & Emery

(57) ABSTRACT

In a structure of wiring connection, plate-like first to fourth wirings are typically used. A connecting portion of the first wiring is connected to that of the third wiring, and a connecting portion of the second wiring is connected to that of the fourth wiring. Each main portion of the first wiring and the second wiring runs together in parallel to face each main face thereof to the other, and that of the third wiring and the fourth wiring runs together in the same manner. Each elbow portion of the first wiring to the fourth wiring is defined as a portion between the main portion and the connecting portion thereof. Between any one of the first wiring to the fourth wiring and one of the other wirings, a specific distance defined as a distance between gravity centers in sections of two corresponding wirings of the first wiring to the fourth wiring cut along a plane vertical to each main face of the two corresponding wirings is less than the predetermined plate width of each of the two corresponding wirings.

19 Claims, 27 Drawing Sheets

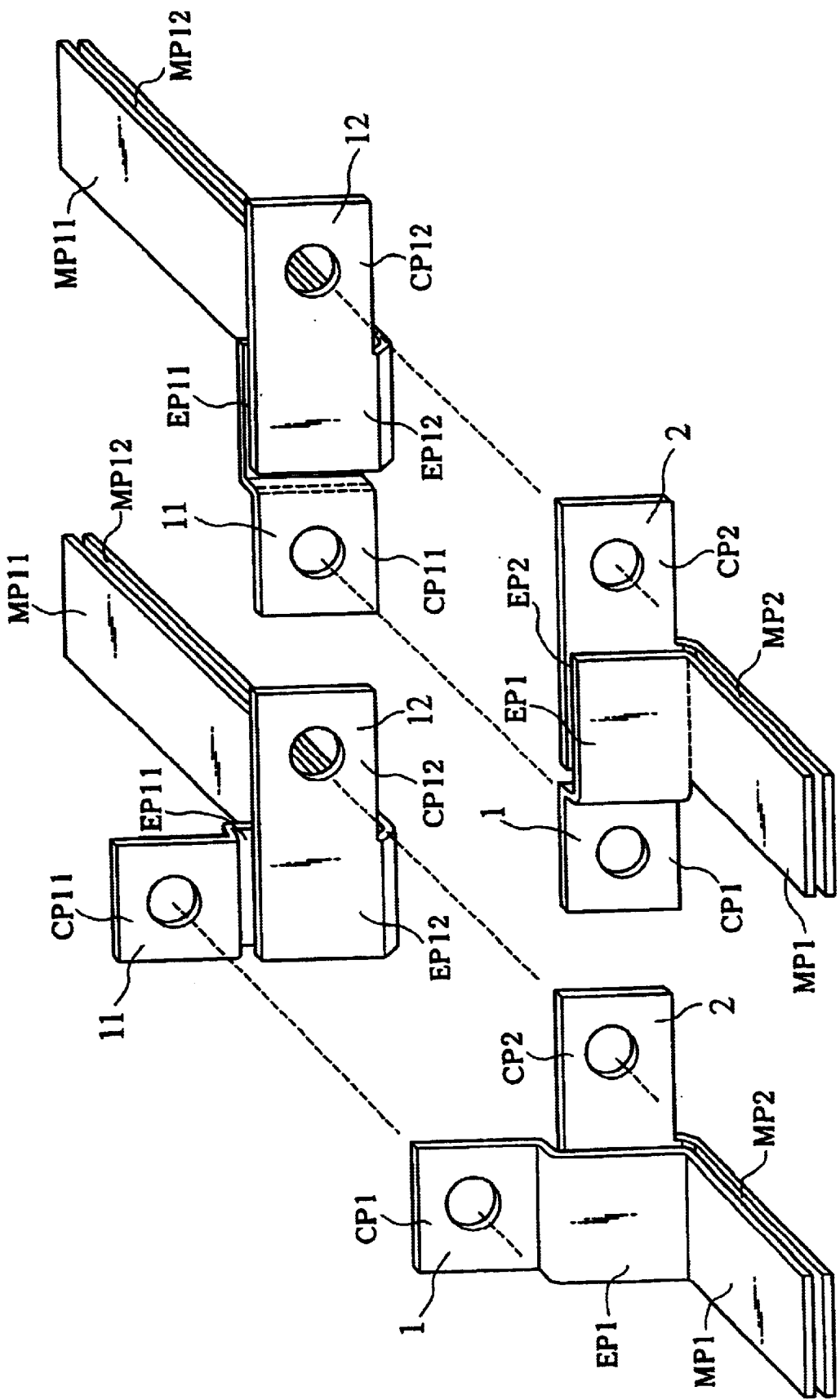

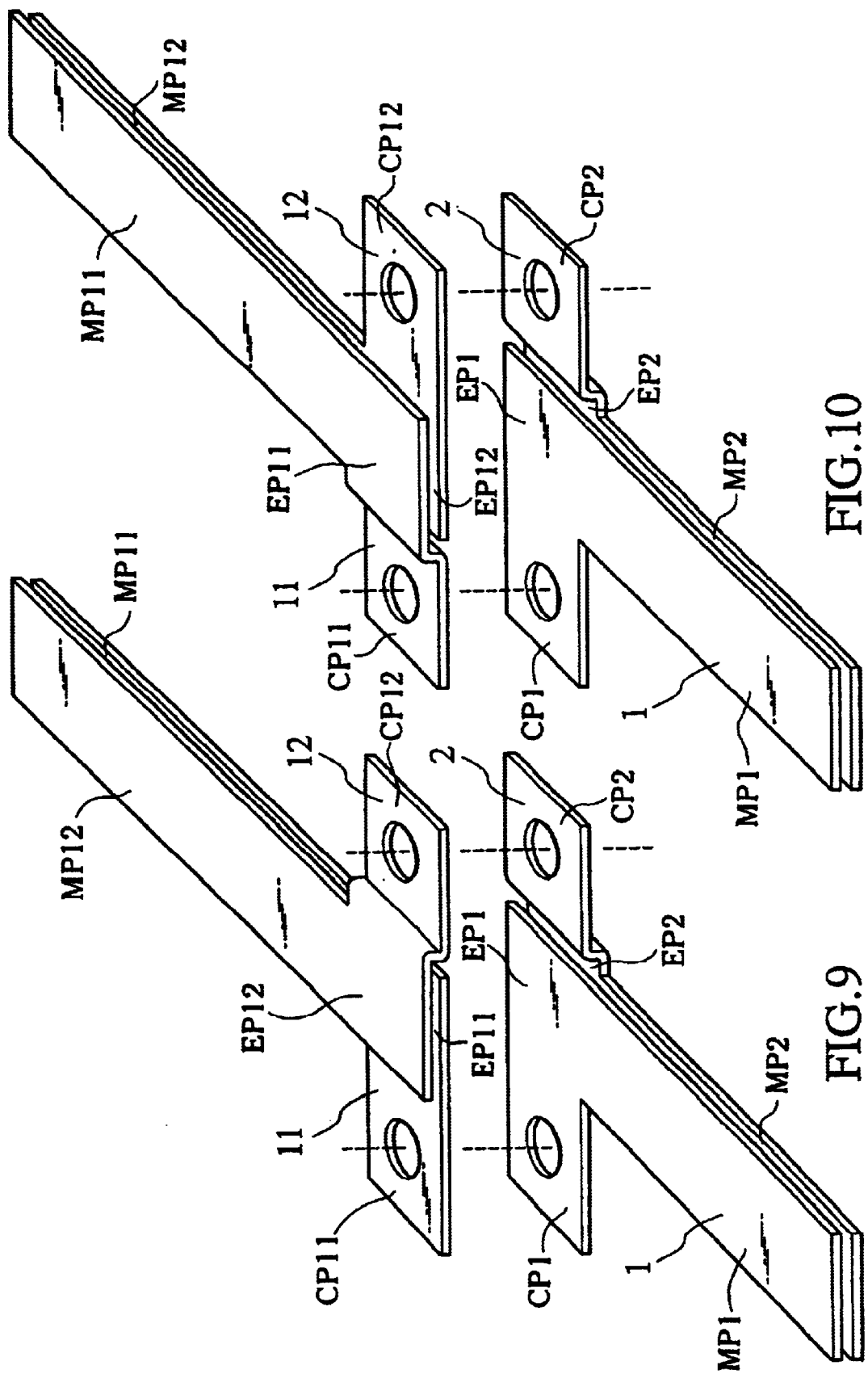

1(N)

2(U)

STRUCTURE OF WIRING CONNECTION

BACKGROUND OF THE INVENTION

The present invention relates to a structure of wiring connection, and more particularly to a structure of wiring connection applied to plate-like electric wirings called as bus bars.

In internal wirings inside an industrial electric device, in which large currents flow, narrow plate-like wirings (plate-like wirings) called as bus bars are often employed as shown in FIG. 42.

Generally, in a device like a large-capacity inverter (DC/AC converter) that switches large currents quickly therein, the two bus bars that flow currents of equal magnitude and of opposite directions to each other are structured in layers and in parallel to be closer as possible, like a bus bar 101 and a bus bar 102 in FIG. 42, which is one of ordinary-seen example of such bus bar formations. With such a structure, magnetic fields created by currents of opposite directions reduce each other, so that the inductance in the entire structure becomes lower than that of other bus bar formations.

SUMMARY OF THE INVENTION

By the way, in case that the pair of bus bars inside an electric device has to connect with external wirings to send or receive current, each bus bar has to have a "connecting portion" for it. Suppose the bus bar 101 and the bus bar 102 in FIG. 42 were internal wirings, a bus bar 111 and a bus bar 112 are to be the external ones. The bus bar 101 is to connect with the bus bar 111, and the bus bar 102 is to connect with the bus bar 112. The external wirings should have the same or similar structures and formation as those of the internal wirings, if reduction of inductance in an entire electric circuit is intended. And connection of these bus bars should be carried out by, for instance, fastening with bolts and nuts considering ease of assembly and maintenance. Consequently, a hole for the fastening is made in each of the connecting portions of the bus bars 101, 102, 111 and 112. And not to interfere the two bolts each other and not to interfere one bolt and a fastening tool when another bolt is fastening, the structure of the connecting portions has to be such that as shown in FIG. 42. Therefore, the partial inductance of this connecting portion becomes far larger than that at the other portion of bus bar pair formation, because the bus bar at the connecting portion cannot be so constructed to be near each other.

The present invention has been achieved through such consideration and an object of the invention is to provide a structure of wiring connection capable of suppressing an increase of inductance effectively.

To achieve the above object, according to one aspect of the present invention, a structure of wiring connection has: a first wiring that extends as a narrow plate having two main faces and having a predetermined plate width, and provided with a main portion, at least one connecting portion and an elbow portion defined as a portion between the main portion and the connecting portion thereof; a second wiring that extends as a narrow plate having two main faces and having a predetermined plate width, and provided with a main portion, at least one connecting portion and an elbow portion defined as a portion between the main portion and the connecting portion thereof; a third wiring that extends as a narrow plate having two main faces and having a predetermined plate width, and provided with a main portion, at least one connecting portion and an elbow portion defined as a portion between the main portion and the connecting portion thereof, the connecting portion of the first wiring and the connecting portion of the third wiring being in contact with each other through a predetermined area; and a fourth wiring that extends as a narrow plate having two main faces and having a predetermined width, and provided with a main portion, at least one connecting portion and an elbow portion defined as a portion between the main portion and the connecting portion thereof, the connecting portion of the second wiring and the connecting portion of the fourth wiring being in contact with each other through a predetermined area. Between any one of the first wiring to the fourth wiring and one of the other wirings, a specific distance defined as a distance between gravity centers in sections of two corresponding wirings of the first wiring to the fourth wiring cut along a plane vertical to each main face of the two corresponding wirings is less than the predetermined plate width of each of the two corresponding wirings. The main portion of the first wiring and the main portion of the second wiring run together in parallel facing each one of main faces thereof, and the main portion of the third wiring and the main portion of the fourth wiring run together in parallel facing each one of main faces thereof.

In such a structure, it is preferable that each predetermined plate width of the first wiring to the fourth wiring is the same width.

In such a structure, it is preferable that the elbow portion of the first wiring and that of the third wiring are in contact with each other, and the elbow portion of the second wiring and that of the fourth wiring are in contact with each other.

In such a structure, it is preferable that the elbow portion of the first wiring and that of the third wiring are in contact with each other to be sandwiched between the elbow portion of the second wiring and that of the fourth wiring.

In such a structure, it is preferable that a part of the elbow portion of the first wiring and that of the third wiring are in contact with each other, and another part of the elbow portion of the first wiring is sandwiched between the elbow portion of the second wiring and that of the fourth wiring.

In such a structure, it is preferable that each connecting portion of the first wiring to the fourth wiring is detachable from a corresponding connecting portion thereof.

According to another aspect of the present invention, a structure of wiring connection has: a first wiring that extends as a narrow plate having two main faces and having a predetermined plate width, and provided with a main portion, at least one connecting portion and an elbow portion defined as a portion between the main portion and the connecting portion thereof; a second wiring that extends as a narrow plate having two main faces and having a predetermined plate width, and provided with a main portion, at least one connecting portion and an elbow portion defined as a portion between the main portion and the connecting portion thereof; a third wiring that extends as a narrow plate having two main faces and having a predetermined plate width, and provided with a main portion, at least one connecting portion and an elbow portion defined as a portion between the main portion and the connecting portion thereof; a fourth wiring that extends as a narrow plate having two main faces and having a predetermined plate width, and provided with a main portion, at least one connecting portion and an elbow portion defined as a portion between the main portion and the connecting portion thereof, the connecting portion of the first wiring and the connecting portion of the fourth wiring being in contact with each other through a predetermined area; a fifth wiring that extends as a narrow plate having two main faces and having a predetermined width, and provided with a main portion, at least one connecting portion and an elbow portion defined as a portion between the main portion and the connecting portion thereof, the connecting portion of the second wiring and the connecting portion of the fifth wiring being in contact with each other through a predetermined area; and a sixth wiring that extends as a narrow plate having two main faces and having a predetermined width, and provided with a main portion, at least one connecting portion and an elbow portion defined as a portion between the main portion and the connecting portion thereof, the connecting portion of the third wiring and the connecting portion of the sixth wiring being in contact with each other through a predetermined area. Between any one of the first wiring to the sixth wiring and one of the other wirings, a specific distance defined as a distance between gravity centers in sections of two corresponding wirings of the first wiring to the sixth wiring cut along a plane vertical to each main face of the two corresponding wirings is less than the predetermined plate width of each of the two corresponding wirings. The main portion of the first wiring, the main portion of the second wiring and the main portion of the third wiring run together in parallel facing each one of main faces thereof, and the main portion of the fourth wiring, the main portion of the fifth wring and the main portion of the sixth wiring run together in parallel facing each one of main faces thereof.

In such a structure, it is preferable that each predetermined plate width of the first wiring to the sixth wiring is the same width.

In such a structure, it is preferable that the first wiring is provided with a region where part thereof is curved such that when the first wiring to the sixth wiring are in a circuit system, and the fourth wiring and the fifth wiring are connected with each other at somewhere therein, inductance for a current through the first wiring, the fourth wiring, the fifth wiring and to the second wiring is equal to inductance for a current through the third wiring, the sixth wiring, the fifth wiring and to the second wiring.

In such a structure, it is preferable that part of the first wiring is provided with a region where the plate width thereof is changed such that when the first wiring to the sixth wiring are in a circuit system, and the fourth wiring and the fifth wiring are connected with each other at somewhere therein, inductance for a current through the first wiring, the fourth wiring, the fifth wiring and to the second wiring is equal to inductance for a current through the third wiring, the sixth wiring, the fifth wiring and to the second wiring.

In such a structure, it is preferable that part of the first wiring is provided with a region where plate thickness thereof is increased such that when the first wiring to the sixth wiring are in a circuit system, and the fourth wiring and the fifth wiring are connected with each other at somewhere therein, inductance for a current through the first wiring, the fourth wiring, the fifth wiring and to the second wiring is equal to inductance for a current through the third wiring, the sixth wiring, the fifth wiring and to the second wiring.

In such a structure, it is preferable that each connecting portion of the first wiring to the sixth wiring is detachable from a corresponding connecting portion thereof.

In the structure of the above one aspect, it is preferable that the first wiring and the second wiring are used as internal wirings in an electric device module, and the connecting portion and the elbow portion of the first wiring and those of the second wiring are exposed on a surface of the electric device module.

In such a structure, it is preferable that the connecting portion of the first wiring and that of the second wiring are provided on a surface of a box-like shell of the electric device module, while the electric device module is a power transistor module, a power diode module or an intelligent power module.

In such a structure, it is preferable that the elbow portions continuing each connecting portion of the first wiring and that of the second wiring are provided on the same surface of the box-like shell of the electric device module as that the connecting portions are provided.

In such a structure, it is preferable that the elbow portions continuing each connecting portion of the first wiring and that of the second wiring are provided on the adjoining surface of the box-like shell of the electric device module to that the connecting portions are provided.

In the structure of the above another aspect, it is preferable that the first wiring to the third wiring are used as internal wirings of the electric device module, and the connecting portion and the elbow portion of the first wiring, those of the second wiring and those of the third wiring are respectively exposed on a surface of the electric device module.

In such a structure, it is preferable that each connecting portion of the first wiring to the third wiring is provided on a surface of the box-like shell of the electric device module, while the electric device module is a power transistor module, a power diode module or an intelligent power module.

Besides, according to still another aspect of the present invention, a wiring connection method prepares first to fourth wirings that respectively extends as narrow plates each having two main faces and having a predetermined plate width, and provided with a main portion, at least one connecting portion and an elbow portion defined as a portion between the main portion and the connecting portion thereof; connects the connecting portion of the first wiring and the connecting portion of the third wiring so as to be in contact with each other through a predetermined area; and connects the connecting portion of the second wiring and the connecting portion of the fourth wiring so as to be in contact with each other through a predetermined area. Between any one of the first wiring to the fourth wiring and one of the other wirings, a specific distance defined as a distance between gravity centers in sections of two corresponding wirings of the first wiring to the fourth wiring cut along a plane vertical to each main face of the two corresponding wirings is less than the predetermined plate width of each of the two corresponding wirings. The main portion of the first wiring and the main portion of the second wiring run together in parallel facing each one of main faces thereof, and the main portion of the third wiring and the main portion of the fourth wiring run together in parallel facing each one of main faces thereof.

Other and further features, advantages, and benefits of the present invention will become more apparent from the following description taken in conjunction with the following drawings.

BRIEF DESCRIPTION OF THE DRAWINGS

FIG. 7 is a perspective view showing a concrete example of the embodiment;

FIG. 8 is a perspective view showing a concrete example of the embodiment;

FIG. 9 is a perspective view showing a concrete example of the embodiment;

FIG. 10 is a perspective view showing a concrete example of the embodiment;

DETAILED DESCRIPTION OF THE PREFERRED EMBODIMENTS

Hereinafter, a structure of wiring connection according to each the preferred embodiments of the present invention will be described in detail with reference to the accompanying drawings.

First, the structure of wiring connection according to the first embodiment of the present invention will be described with reference to and from FIG. 1 to FIG. 14.

Figure 1:
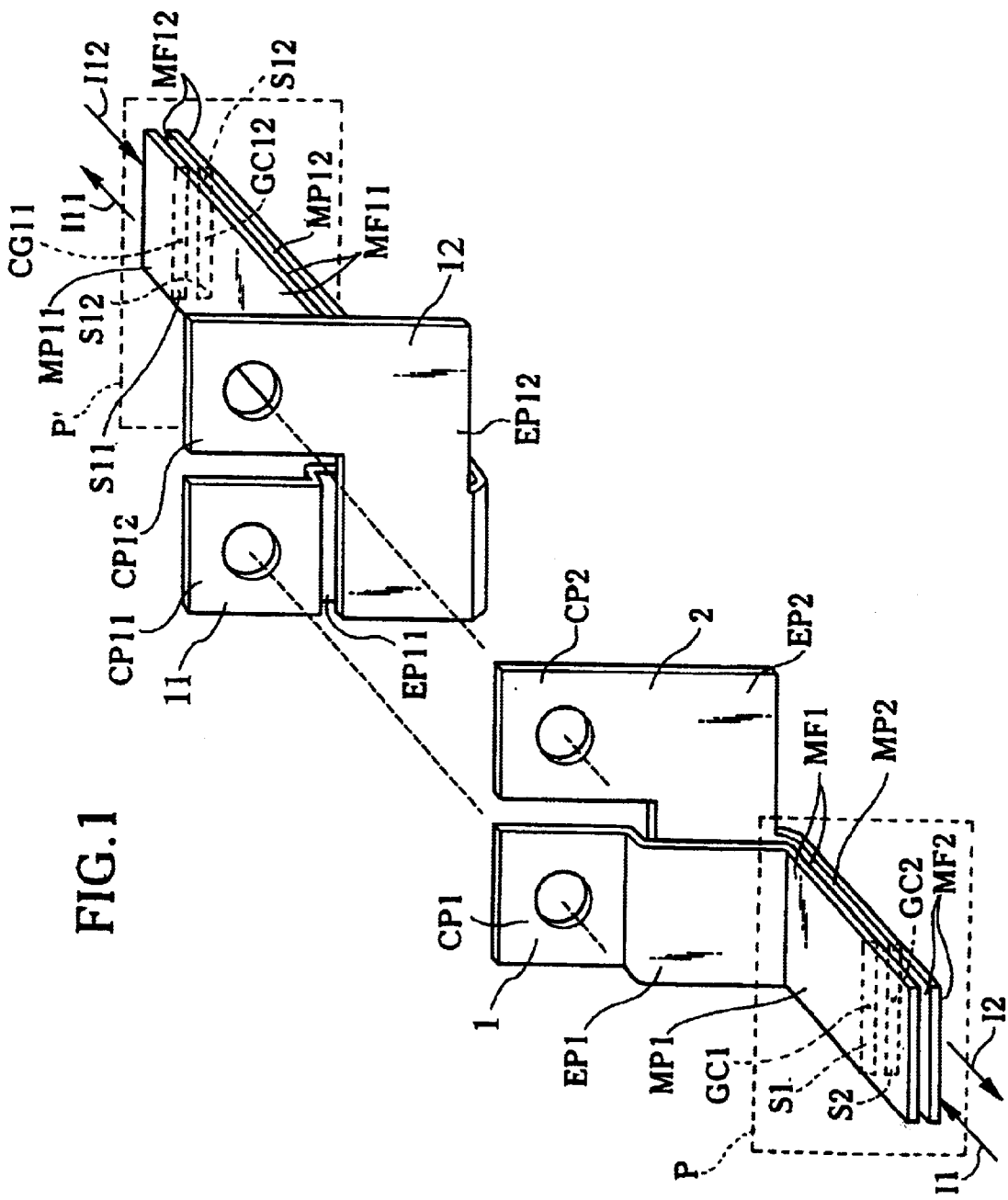
FIG. 1 is a perspective view showing the first embodiment of a structure of wiring connection according to the present invention.

FIG. 1 shows the structure of wiring connectin of the first embodiment of the present invention. There are bus bars 1, 2, 11 and 12, each of which is a narrow metal plate having two main faces MF1, MF1, MF2, MF2, MF11, MF11 and MF12, MF12, and having a predetermined plate width. The bus bar 1 and bus bar 2 (corresponding to first and second wirings in the undermentioned claims) are running in parallel, and in layers and set close as possible, but not in contact with each other (such a formation is obtained, for instance, by using a thin insulating film, which is not shown in the figure). The bus bar 11 and the bus bar 12 (corresponding to third and fourth wirings in the undermentioned claims) are also provided in the same manner.

The portion of a bus bar where the current I1, I2, I11 or I12, of opposite direction to the current I2, I1, I12 or I11 flowing in the nearest portion of the partner bus bar, can flow is defined as the main portion MP1, MP2, MP11 or MP12. Each of the bus bars has the connecting portion CP1, CP2, CP11 or CP12 that has at least one hole for fastening to others by a bolt and nut (now shown in FIG. 1), and has a predetermined electrically contacting area around the hole. The dashed lines in FIG. 1 predict these relationships, so that the bus bar 1 is to be fastened to and connected with the bus bar 11, and the bus bar 2 is to be fastened to and connected with the bus bar 12. The portion between the main portion and the connecting portion of a bus bar, which cannot be included by either definition, is called here the elbow portion. In FIG. 1, each bus bar is bent with a right angle at the end of each main portion or at the beginning of the elbow portion EP1, EP2, EP11 or EP12. The elbow portion of the bus bar 2 and that of the bus bar 12 are electrically contacted with each other in this case, when they are fastened up. In the elbow portion of the bus bar 1, the current direction of the nearest portion of the bus bar 2 cannot obviously be defined, and the same condition in the elbow portion of the bus bar 11 is encountered. The bus bar 1 and the bus bar 11 are fastened with riding over the elbow portion of the bus bar 2 and that of the bus bar 12 as shown in FIG. 1.

Next, difference of the effect between the above-mentioned structure and the structure described in FIG. 42 will be explained. Before the explanation, a specific distance between the bus bars, the plate width and the plate thickness will be defined as followings, because the partial inductance of a part of the bus bar set is related to the distance between the bus bars.

First of all, the cross section of a narrow plate or a bus bar cut with a flat plane P or P' vertical to the direction that the narrow plate extends is called here the regular cross section. Generally, the shape of the regular cross section of the plate is a rectangle or the shape that can be regarded as almost a rectangle. In that case, the plate width can be defined as the length of the long side of the rectangle. The plate thickness can be defined as the length of the short side of the rectangle. Although not shown, when it is considered that the regular cross section of a plate is an ellipse or the shape that can be regarded as substantially an ellipse, the plate width can be defined as the major axis of the ellipse, and the plate thickness can be defined as the minor axis of the ellipse.

The specific distance between bus bars at the main portions is generally defined as the distance between the gravity centers GC1, GC2, GC11 and GC12 of corresponding bus bar's cross sections S1, S2, S11 and S12 cut along the flat plane P or P' vertical to the direction that the bus bars extend, and includes a point of either bus bar. If the bus bar has a corner like the bus bar 2 in FIG. 1, the locus of the gravity center can be defined along the line where the bus bar 2 extends. Anyway, the specific distance is generally defined only between currents flowing along the direction where each bus bar extends. If current flows along the direction of the plate thickness, like between the elbow portions of the bus bar 2 and the bus bar 12 in FIG. 1, the geometrically defined specific distance does not generally have meaning, because it is generally for calculating the partial inductance between corresponding bus bars. However, in the embodiment, the specific distance is especially defined as a distance between the gravity centers GC1, GC2, GC11 and GC12 in the cross sections S1, S2, S11 and S12 of two corresponding bus bars cut along a flat plane P or P' vertical to each main face of the two corresponding bus bars, and more especially, such a specific distance is set to be less than the predetermined plate width of each of the two corresponding wirings. Such a novelly introduced specific distance is employed throughout the whole embodiments of the present invention.

Figure 42:
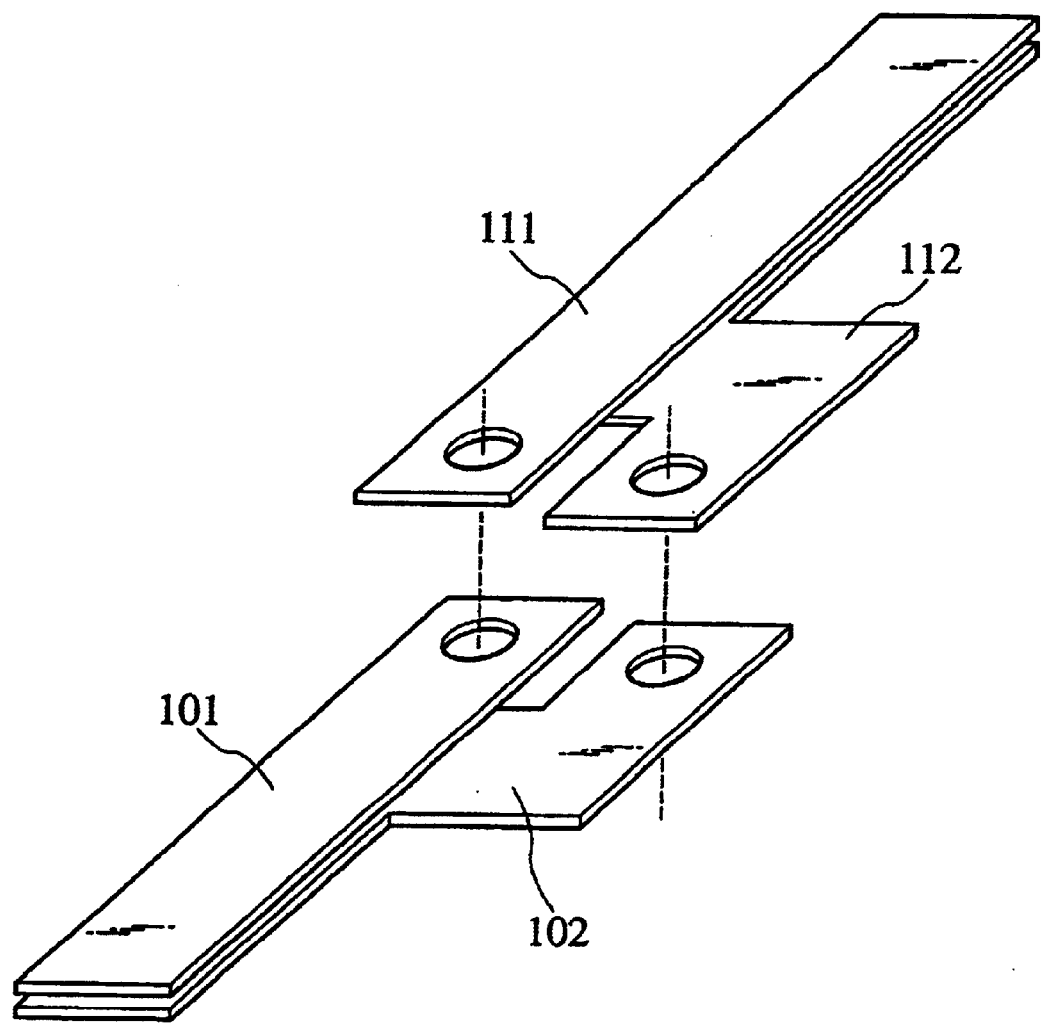
FIG. 42 is a view showing a structure of wiring connection in the related art of the present invention.

In the structure shown in FIG. 42, because of consideration for the necessity such that respective bolts and nuts used at each connecting portion should not interfere with each other, the bus bar 102 and the bus bar 112 are so constructed as to emerge laterally from a line, on which the bus bar 101 and the bus bar 111 extend, in such a manner that they have portions not contacting each other.

For example, assuming that the width of each bus bar is 20 mm, the thickness thereof is 2 mm and the thickness of an insulating material sandwiched between the bus bar 101 and the bus bar 102 and between the bus bar 111 and the bus bar 112 is 1 mm, the specific of a pair of the bus bars (for example, between the bus bar 101 and the bus bar 102) is 3 mm. However, in the connecting portion between the bus bar 102 and the bus bar 112, the specific distance is at least 20 mm or more which is the width of each bus bar and the length of such a region is considered to be about three times the width of the bus bar. More specifically, assuming that a gap between the bus bars is required to be about 2 mm, it comes that there exists a region in which the specific distance is about 22 mm. In such a structure, according to inductance simulation, an increment of inductance of the connecting portion is estimated to be 25.6 nH.

On the other hand, in the structure shown in FIG. 1 of this embodiment, the bus bar 2 and the bus bar 12 overlap each other at each connecting portion having a flat portion in the surrounding of the fastening portion and also the elbow portion having a flat portion continuously therefrom, such that they are entirely in contact so as to ensure sufficient conductivity. Therefore, it has substantially the same structure as a state without any general connecting portion in which an emerging portion not overlapping the other bus bar is provided as seen in the structure of FIG. 42. Although the bus bar 1 and the bus bar 11 have the elbow portions riding over the elbow portions of the bus bar 2 and the bus bar 12, a sufficient conductivity is ensured through the flat portions in the surrounding of the fastening portions of the connecting portions thereof. In the elbow portions of bus bar 1 and the bus bar 11, the current flows in the opposite directions to each other, while the elbow portions of the bus bar 2 and the bus bar 12 are sandwiched therebetween. With such a structure, according to an inductance simulation, an increment of inductance due to the connecting portions is estimated to be 6.5 nH, which is about ¼ the increment of inductance in the structure shown in FIG. 42. Incidentally, although in the elbow portions in which the bus bar 1 and the bus bar 11 ride over the bus bar 2 and the bus bar 12 respectively, there is a region in which the currents in the bus bar 1 and the bus bar 11 are separated from each other throughout the length larger than the width of the bus bar 2 and the bus bar 12, the bus bar 1 and the bus bar 11 are only separated from each other at an interval of about several times the thickness of each bus bar, which is less than the width of the bus bar enough. Thus, contribution to an increment of inductance in this region is substantially negligible.

Therefore, according to this embodiment, with such a structure, inductance of connecting structure containing the bus bar can be reduced effectively.

Hereinafter, the structure of wiring connection of this embodiment will be described further in detail with reference to a concrete application example.

Figure 2:
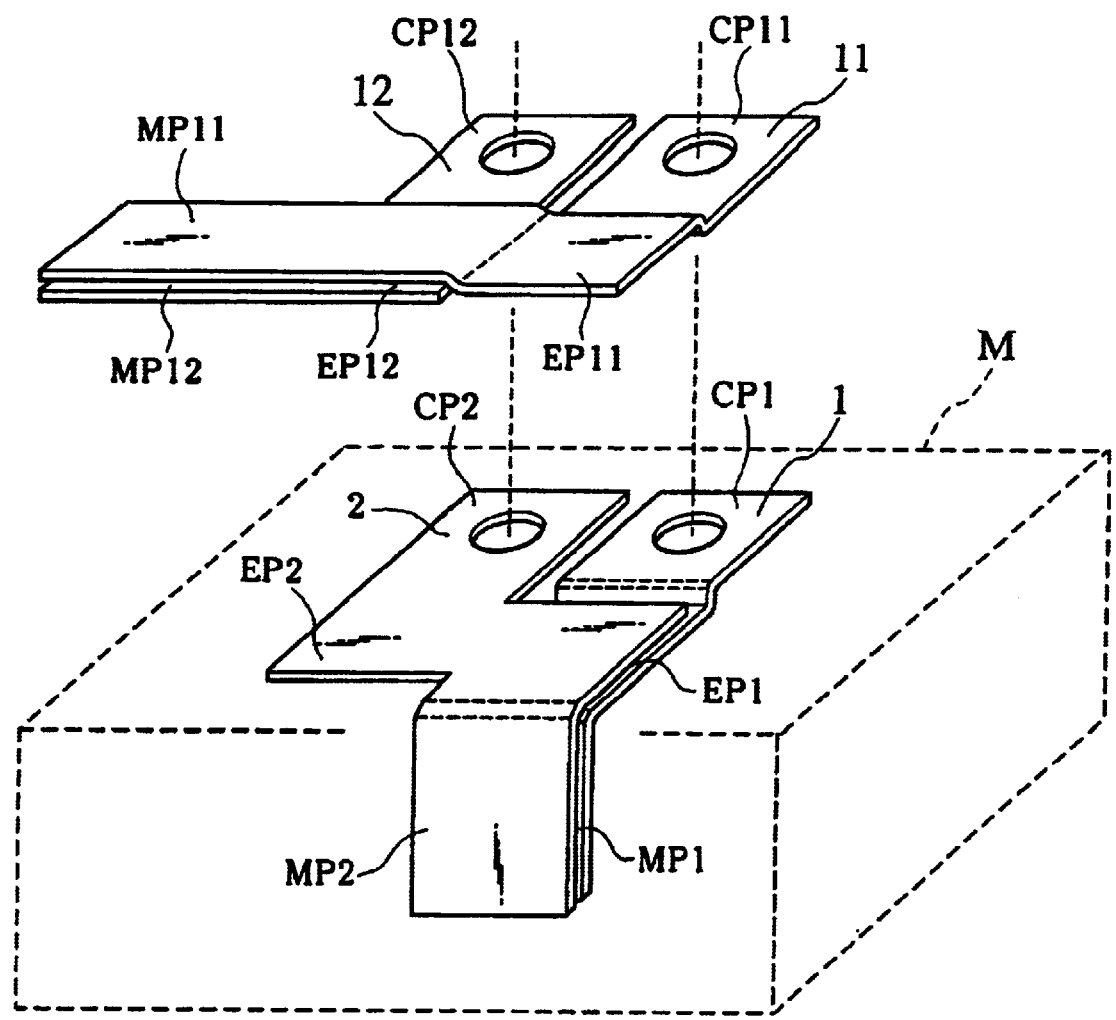
FIG. 2 is a perspective view showing a concrete example of the embodiment.
Figure 3:
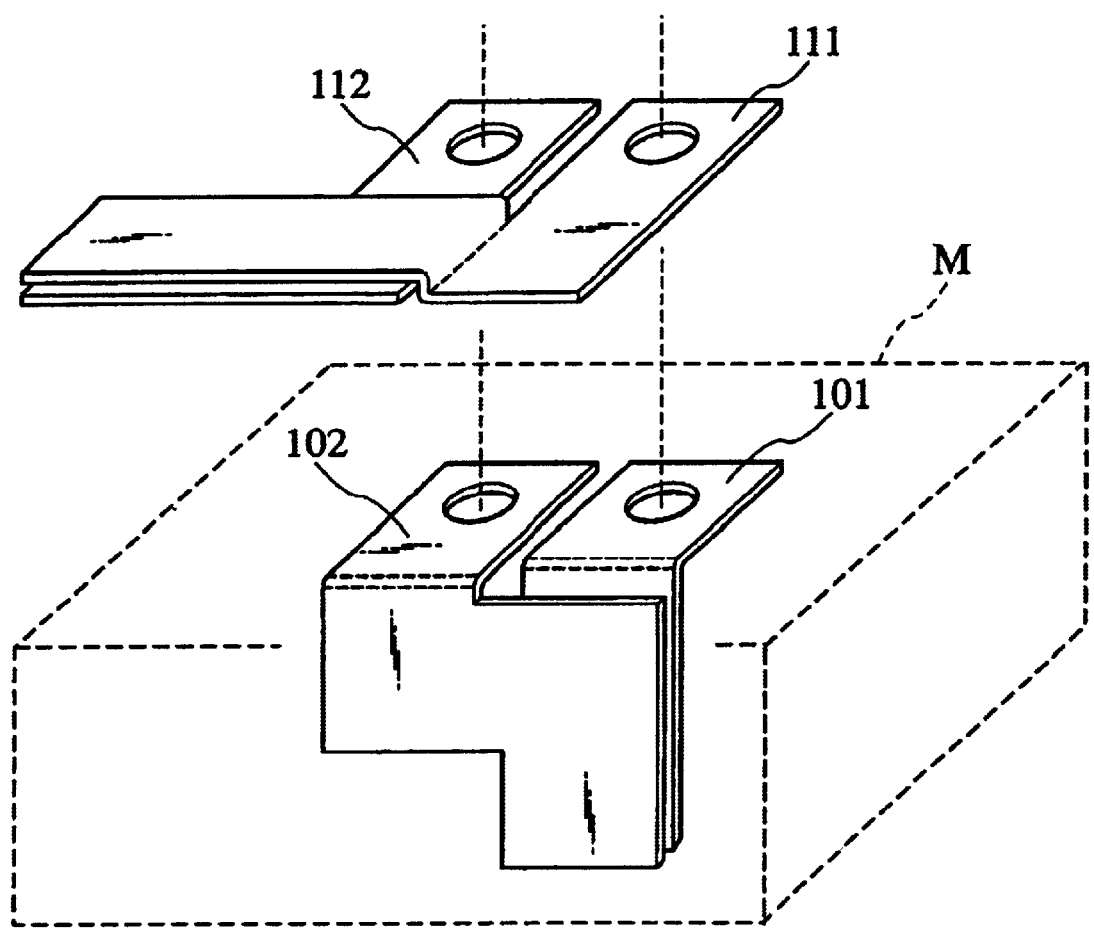
FIG. 3 is a perspective view showing a structure of wiring connection according to a comparative example in the embodiment.

Such a concrete application example of this embodiment is shown in FIG. 2, and a comparative application example employing the structure shown in FIG. 42 is shown in FIG. 3. First, FIG. 3 will be referred to prior to FIG. 2 as a matter of convenience.

FIG. 3 indicates the example of applying the structure shown in FIG. 42 to the bus bar of internal wire in the power transistor module.

In FIG. 3, the relation between the front and rear faces of the connecting portion is different from that of FIG. 42 and the bus bar 101 and the bus bar 102 are bent at their connecting portions, but the proper structure is the same in view that that the bus bar 101 and the bus bar 102 are not kept adjacent to each other.

In the structure as shown in FIG. 3, their connecting portions emerge so that they are exposed from the external shape of the power transistor module. Also, the connecting portions have the specific distance larger than the width of each bus bar.

On the other hand, in the structure shown in FIG. 2, the structure including the connecting portion and the elbow portion of each bus bar shown in FIG. 1 is applied appropriately to the power transistor module.

A difference between the structure shown in FIG. 2 and the structure shown in FIG. 3 is that a portion continuous from the fastening portion of each bus bar is also in the vicinity of its corresponding bus bar.

With such a structure having the bus bar 11 and the bus bar 12, even if a terminal to be connected externally is needed, an increase of inductance of each of the connecting portions can be largely reduced.

That is, with such a structure, each elbow portion is preferably provided, and any position to be included in the main portion, the connecting portion, and the elbow portion of any one of the bus bars 1, 2, 11 and 12 faces to at least one of the other bus bars such that the specific distance thereof is less than the width of each of the bus bars 1, 2, 11 and 12. Also, the main portion of the bus bar 1 and the main portion of the bus bar 2 run together in parallel such that the main faces thereof face to each other in a condition that the specific distance thereof is less than the width of each of the bus bar 1 and the bus bar 2. And also, the main portion of the bus bar 11 and the main portion of the bus bar 12 run together in parallel such that the main faces thereof face to each other in a condition that the specific distance thereof is less than the width of each of the bus bar 11 and the bus bar 12.

Accordingly, with such a structure in this embodiment, inductance can be largely suppressed entirely as a structure of wire connection including respective bus bars.

Incidentally, the connecting structure of this embodiment and also that of a second embodiment, which will be appropriately described latter in detail, can be applied to not only the power transistor module but also the structure of the bus bar of internal wiring in the diode module for electric power (power diode module) or an intelligent power module (IPM), together with the structure of the bus bar of external wiring connected thereto.

In the structure of the connecting portion shown in FIG. 2, each connecting occupies a relatively large area of the surface of the power transistor module.

Figure 4:
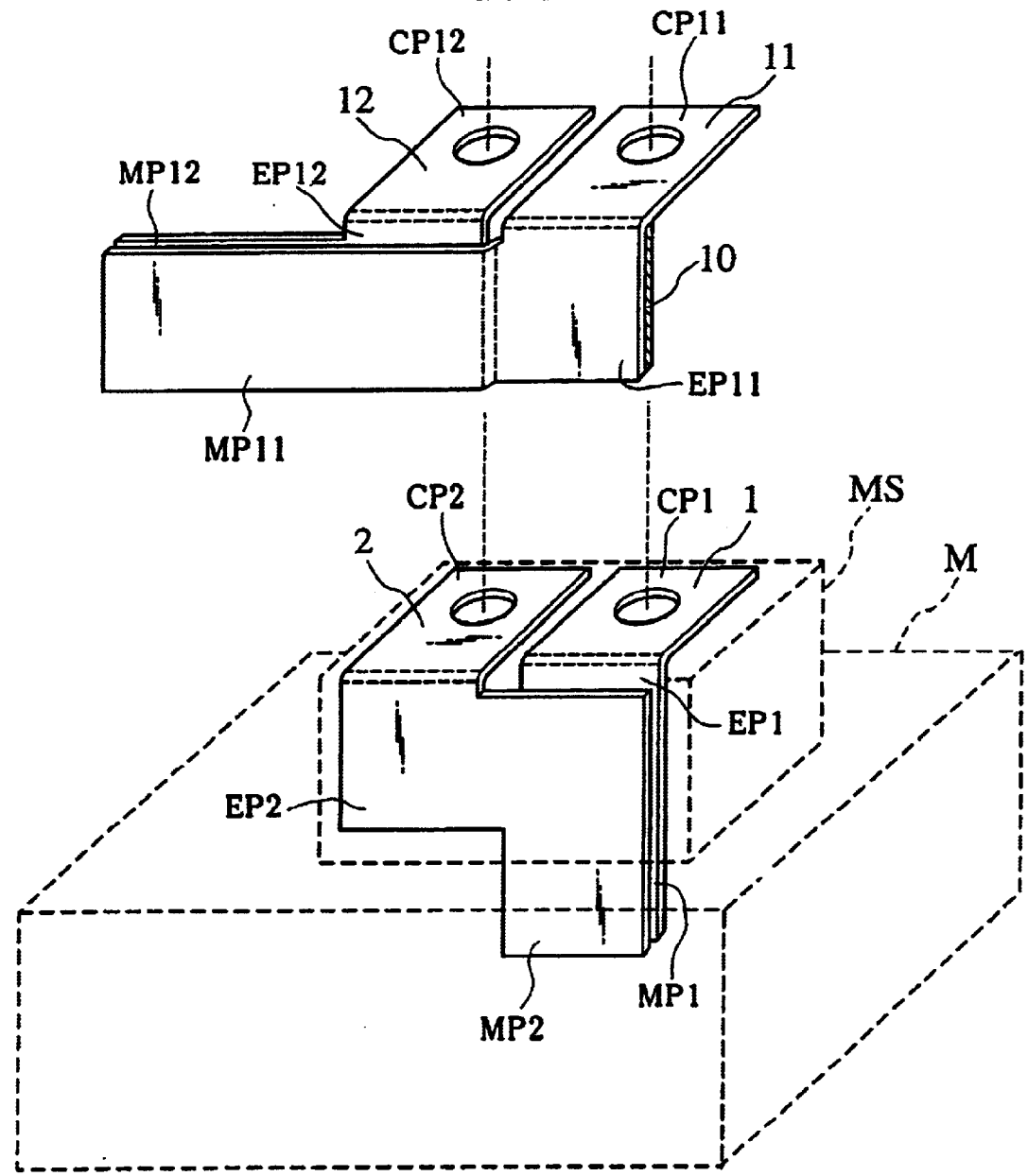
FIG. 4 is a perspective view showing a concrete example of the embodiment.

If the size of the power transistor module is small so that a sufficient area cannot be secured, the structure of a connecting portion shown in FIG. 4 may be employed.

That is, in the power transistor module M, generally, a portion MS for accommodating a nut corresponding to a bolt to be mounted from above in FIG. 4 is protruded from the surface of the power transistor module M. The connecting portions of the bus bar 1 and the bus bar 2 of internal wires are disposed on top of the nut accommodating portion MS. Further, as shown in FIG. 4, the bus bar 1 and the bus bar 2 of the internal wirings are disposed on side faces of the nut accommodating portion MS, such that the L-letter shaped terminals are exposed. Correspondingly, the bus bar 11 and the bus bar 12 of the external wirings formed in the L shape are mounted. Incidentally, reference numeral 10 in FIG. 4 denotes an insulating plate provided so as to block the bus bar 11 and the bus bar 2 from making contact with each other.

With such a structure, inductance can be largely suppressed while restricting a connecting portion occupying area as an exclusively occupying area, effectively.

In the mean time, in the intelligent power module (IPM), an edge of that module is often provided with the connecting portions.

Figure 5:
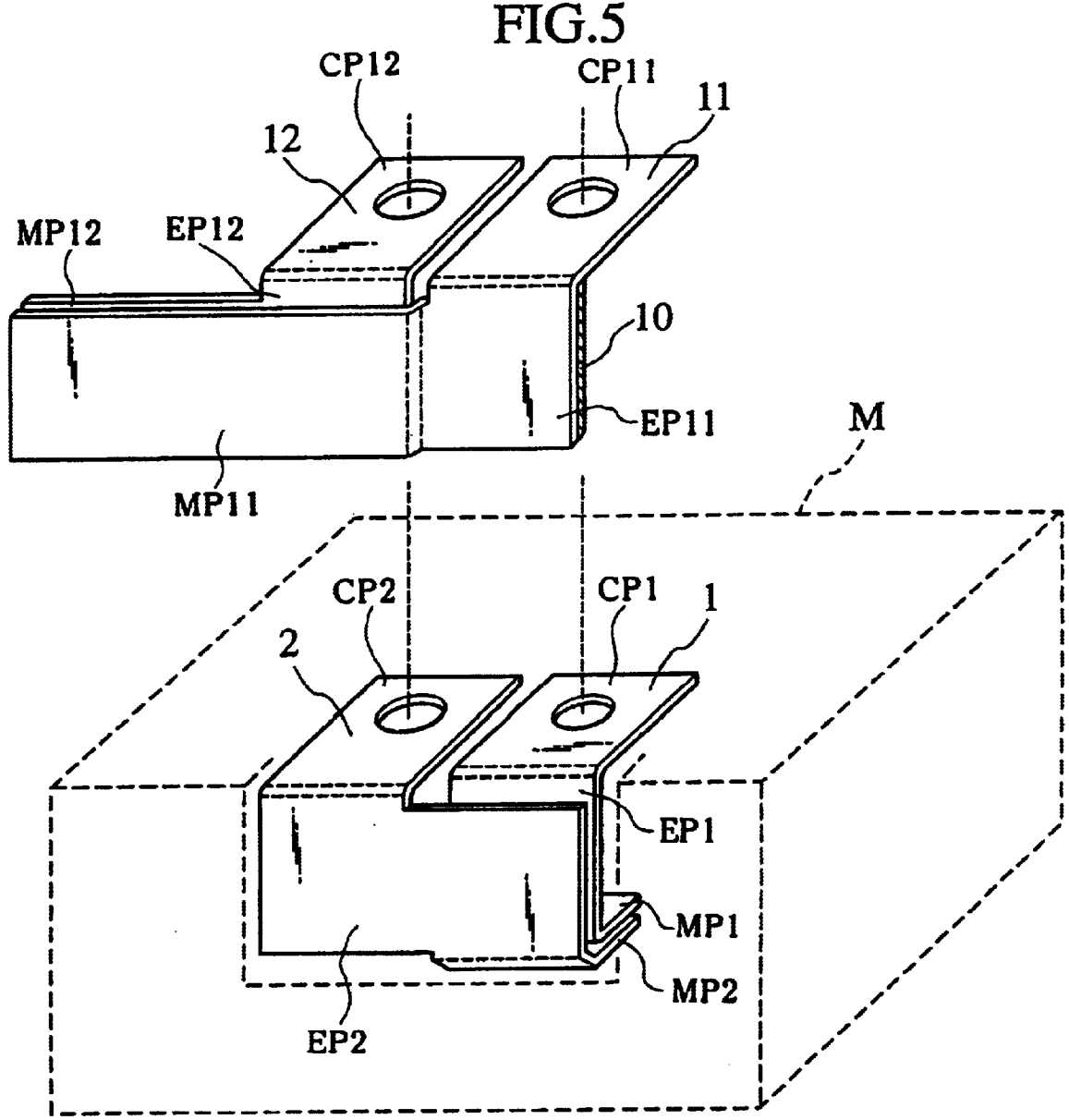
FIG. 5 is a perspective view showing a concrete example of the embodiment.

In such a case, as shown in FIG. 5, the bus bar 1 and the bus bar 2 of the internal wirings are disposed on the side wall of the intelligent power module M such that they are exposed and combined with corresponding bus bar 11 and the bus bar 12, thereby making it possible to obtain a structure of the connecting portion having a low inductance.

Also, the main portions of corresponding bus bar pairs may be extended in any directions from the overlapped elbow portions, and the above-mentioned structure as shown FIG. 1 is one example.

Figure 6A:
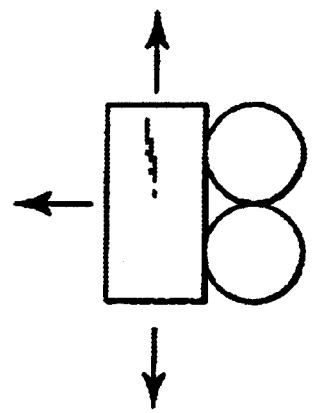
FIGS. 6A to 6C are schematic diagrams for explaining a variation of the structure of the embodiment.
Figure 6B:
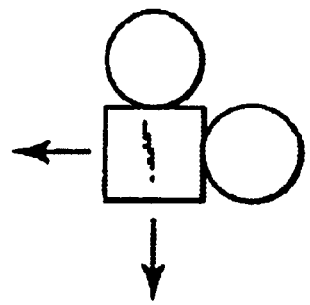
Figure 6C:
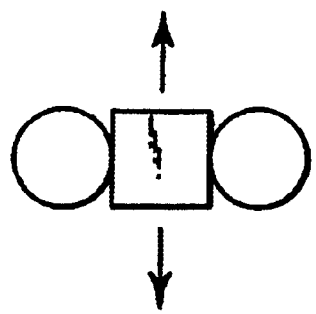

FIG. 6A to FIG. 6C are schematic diagrams explaining the variation of the relationship among connecting portions, elbow portions and main portions. In these diagrams, each circle indicates each connecting portion fastened with each other. Each rectangle or square indicates the overlapped elbow portions. And each arrow indicates the direction allowing each pair of the bus bars to extend their main portions. The two pairs of main portions can be extended along the same direction in these diagrams. Moreover, each of them may be extended to any direction apart from the paper plane. Or it may be extended to the vertical direction to the paper plane. For instance, the structures shown in FIG. 1 and FIG. 2 correspond to the category of FIG. 6A. In most of connecting patterns, upper-side plate, for instance, of a bus bar pair connects with the same-side plate of the other pair as shown in FIG. 1. However, in some patterns, upper-side plate of a bus bar pair connects with the bottom-side plate of the other pair, for instance, as shown in undermentioned FIG. 9.

FIG. 7 shows the structure in which the bus bar corresponding to FIG. 6B is extended and FIG. 8 to FIG. 10 shows the structure in which the bus bar corresponding to FIG. 6C is extended.

In the structures shown in FIG. 7 to FIG. 9, an increase of inductance becomes 2.45 nH if calculating with the specification described above as compared to a case where there is no connecting portion and elbow portion, so that it can be kept to about 1/10 the structure in FIG. 42. Although in the structure shown in FIG. 9, the up/down relation of the wiring is inverted by connection. If the structure shown in FIG. 10 is employed, this can be prevented. However, the increase of inductance is 5.06 nH, which is a little larger than the above case.

Figure 11:
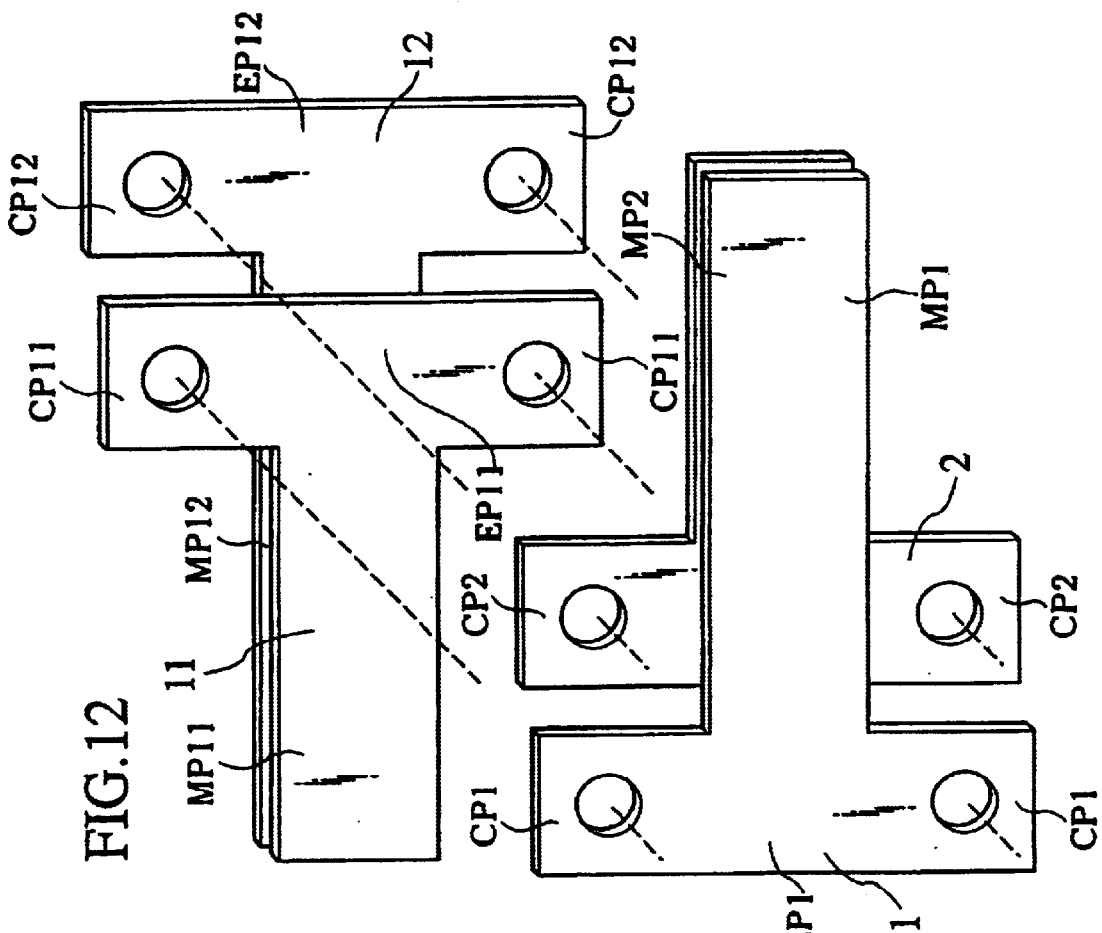
FIG. 11 is a perspective view showing a concrete example of the embodiment.
Figure 12:
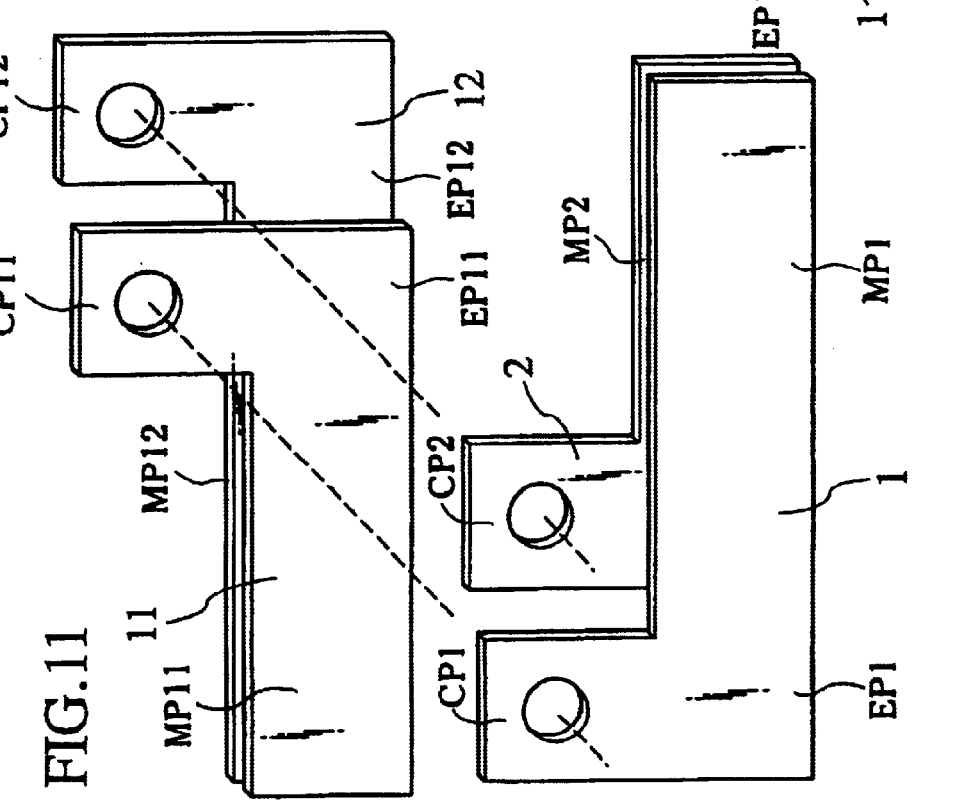
FIG. 12 is a perspective view showing a concrete example of the embodiment.

Then, the structures shown in FIG. 11 and FIG. 12 have almost the same effect as the structures described above. These do not have any elbow portion which rides over other bus bar, so that a flat configuration is used. When opposing currents flow through the connected bus bars, there is no portion in which the currents flowing through both the wires are not separated from each other by more than a distance between the currents in the main portions. In this case also, the bus bar continuous to the connecting portion may be extended in any direction. Under the structure of FIG. 12, two fastening portions are provided in each connecting portion thereby making more secure contact between the bus bars.

Figure 13:
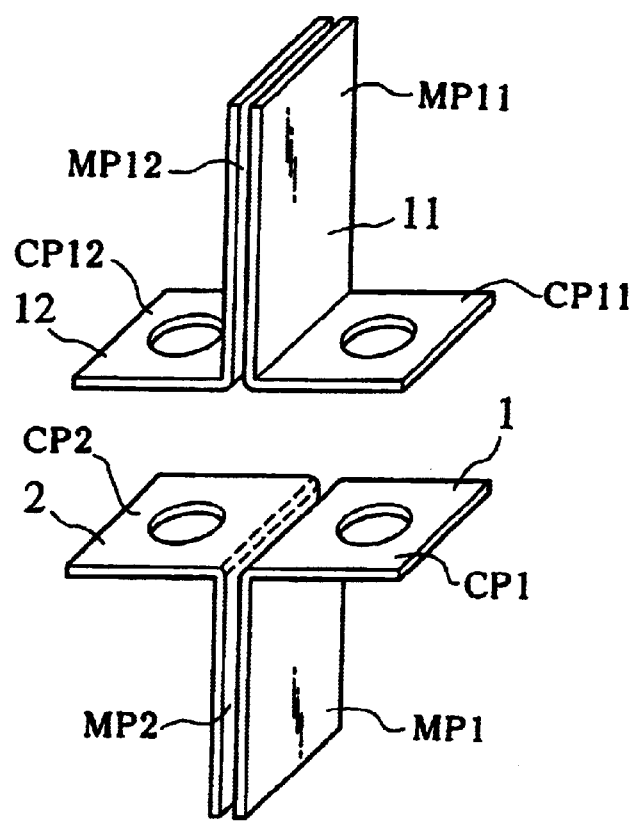
FIG. 13 is a perspective view showing a concrete example of the embodiment.
Figure 14:
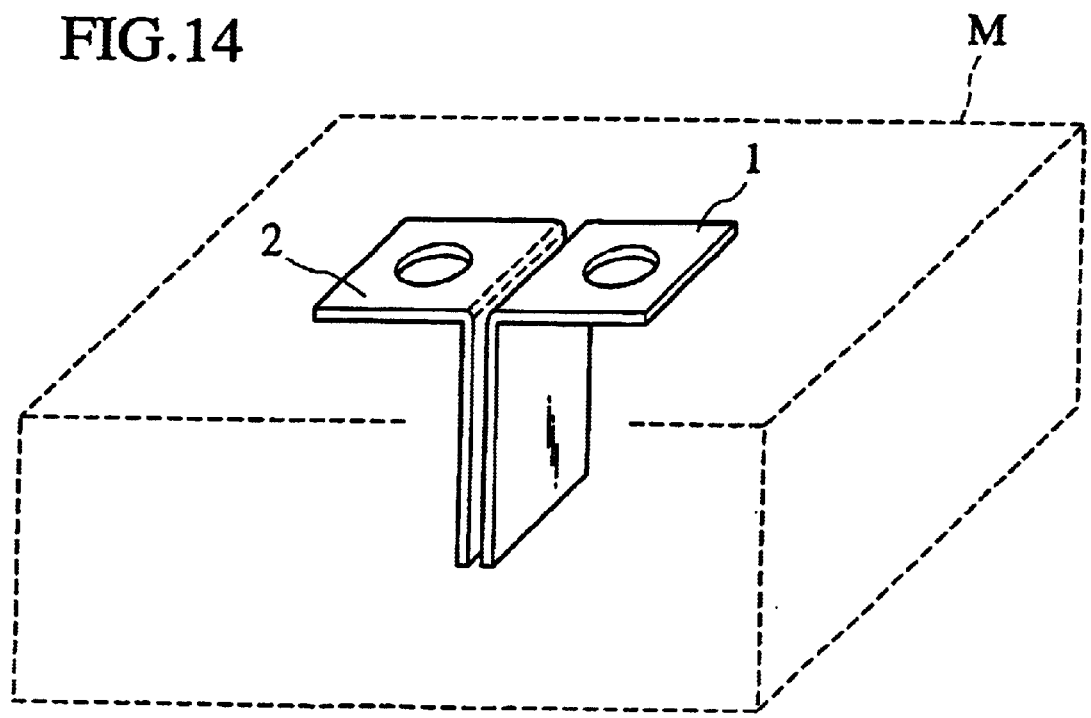
FIG. 14 is a perspective view showing part of a structure of wiring connection used for reference in the embodiment.

Further, the structure shown in FIG. 13 may be employed. In such a case, the connecting portions of corresponding bus bars are in contact with each other so as to ensure a sufficient conductivity, and the connecting portions of the corresponding bus bars are continuous quickly to the main portions such that the main portions extend to face to each other. In other words, the elbow portions of the bus bars 1, 2, 11 and 12 are respectively minimized. Thus, with such structure, the connecting portions of the bus bars 1, 2, 11 and 12 secure a sufficient conductivity and at any position of their main portions, the main face of the bus bar faces that of the other bus bar such that the specific distance is less than the width of each of the bus bars 1, 2, 11 and 12 and therefore, the increase of inductance in the connecting portion is substantially negligible. It can be estimated that this structure is an optimum structure for the power transistor module having the bus bars with the structure shown in FIG. 14.

In the meantime, according to this embodiment, the connecting portion may use screw fastening or riveting and other press-fit system may be used depending on the necessity.

Next, the structure of wiring connection according to the second embodiment of the present invention will be described with reference to FIG. 15 to FIG. 41.

Figure 15:
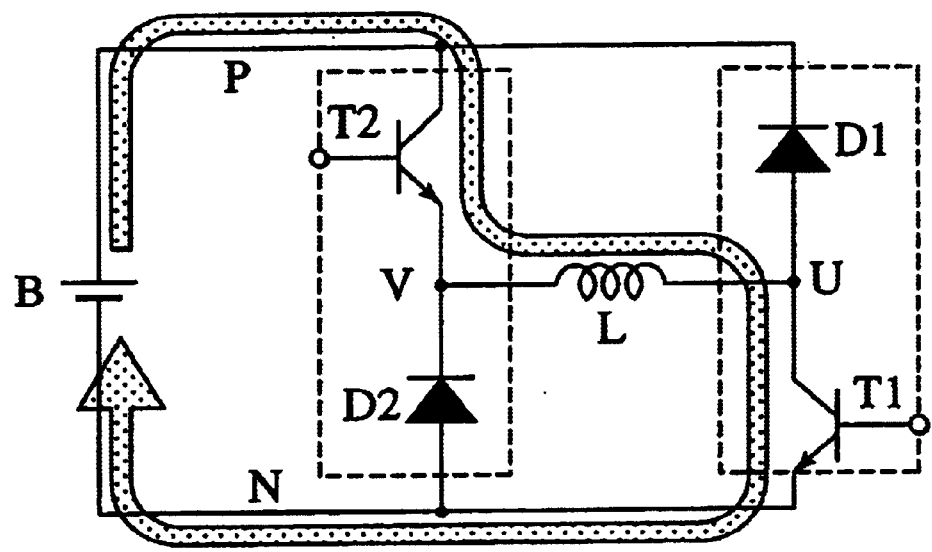
FIG. 15 is a comparative circuit diagram for explaining the necessity of the second embodiment of the present invention.
Figure 16:
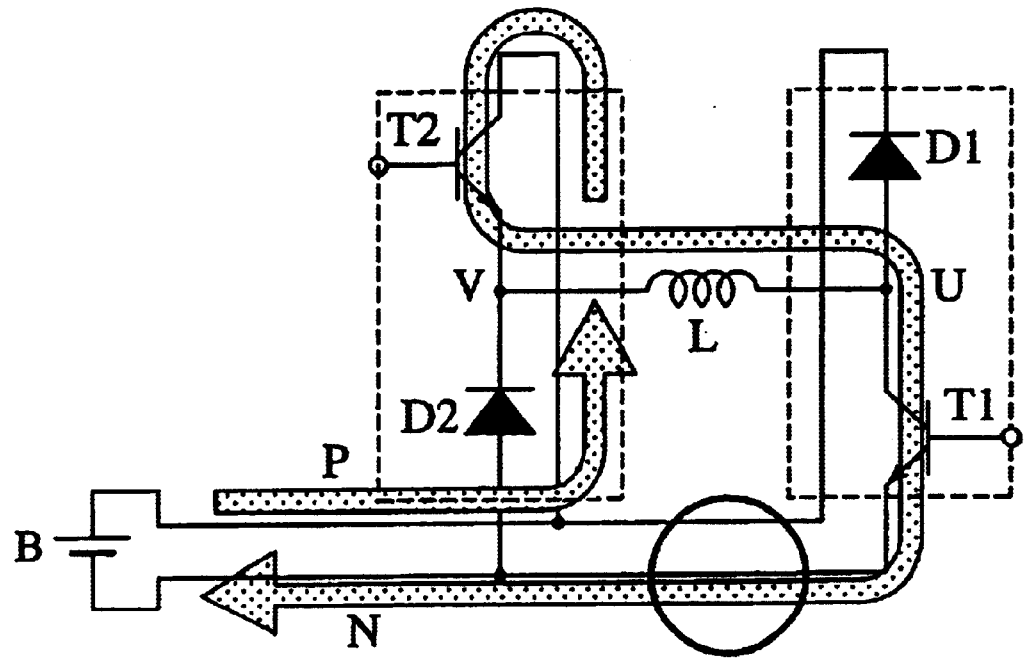
FIG. 16 is another comparative circuit diagram for explaining the necessity of the second embodiment of the present invention.
Figure 17:
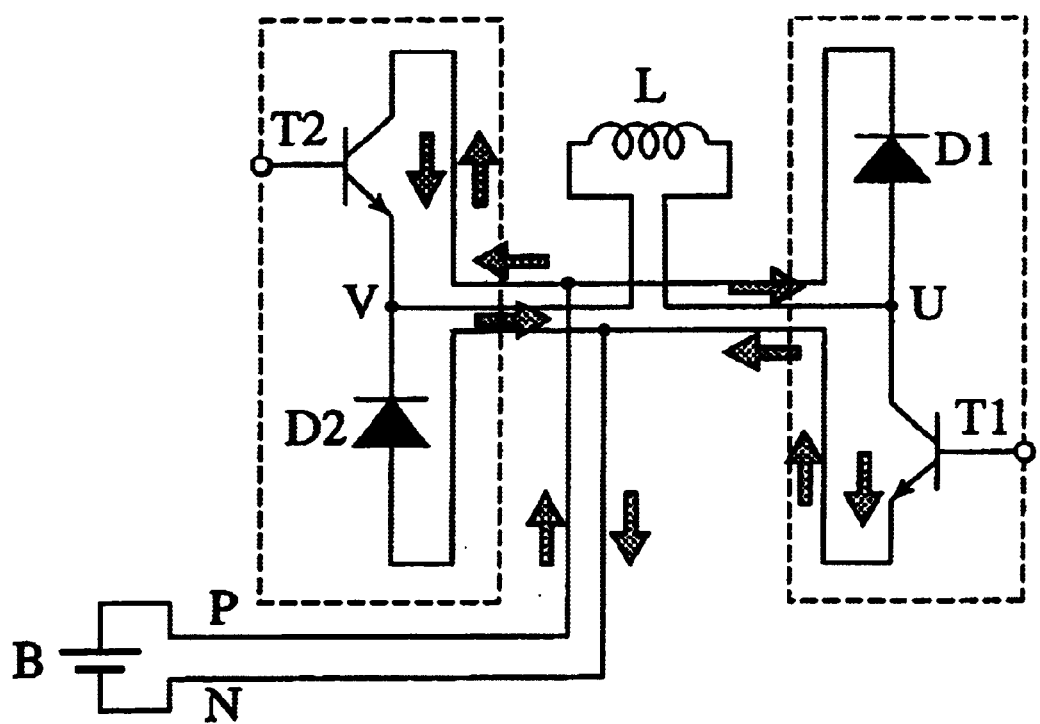
FIG. 17 is a circuit diagram for explaining the necessity of the second embodiment of the present invention.

Referring to FIG. 15 to FIG. 17, the power transistor module on which the structure of the connecting portion of this embodiment is applied will be described.

FIG. 15 shows a bridge circuit which sends rectangular wave to a load L (for example, motor) to drive it, which is drawn here about only portions necessary for explanation. In the same figure, B indicates a battery, P indicates positive potential wiring and N indicates a ground wire corresponding thereto. The dashed line indicates a power transistor module, which is a set for achieving an actual circuit.

With such structure, two transistors T1 and T2 are synchronously turned ON/OFF. For example, at an instance when the transistor T1 gets conductive with the transistor T2, in the power transistor module in U phase, current flows from U to N. Then, if both the two transistors T1 and T2 are turned off, the current flows from U to P due to induced electromotive force in the load L in the power transistor module in U phase while no current flows to the ground line N.

Meanwhile, the structure of FIG. 15 functions as a chopper circuit for if the load L is a motor, making it produce a desired output. In an actual machine, its transistor and wiring allocation relations are substantially the same.

Assume that a current flows along a path indicated by an arrow of FIG. 15. Because the current path draws a large loop, inductance sensed by this current is quite large, so that it can be considered that it affects operations of the transistors T1, T2 and the diodes D1, D2.

Then, although it can be considered to reduce inductance of the entire circuit by disposing the positive potential wiring P and the ground wire N (power supply line) in the vicinity with each other as shown in FIG. 16, a portion of wiring indicated with a circle in FIG. 16 is a structure having the adjacent facing wirings but actually not a structure in which the opposing currents flow in the facing wirings. Thus, an effect of reducing inductance cannot be expected sufficiently. Also, because inductance of an output line of the power transistor module is in series with inductance of the load L connected forward and relatively small, it has been generally considered as negligible one. However, the inductance at such a portion has to be precisely considered. Incidentally, an arrow in FIG. 16 indicates a current path.

A structure achieved through the above described consideration to reduce inductance of the entire circuit is shown in FIG. 17. Incidentally, an arrow in FIG. 17 indicates a current path.

That is, the output line of the power transistor module in U phase and the output line of the power transistor module in V phase are disposed adjacent each other and then, the positive potential wire P and the ground wire N are made to run together up to a position where the output wire of the power transistor module in U phase is located adjacent the output wire of the power transistor module in V phase.

With such a structure, the effect of reduction of inductance with the opposing currents in the current paths located adjacent each other can be expected in substantially all region on the current path.

Thus, if these three wires are structured in three layers (three stage layered structure or three piece layered structure) in the order of P, U and N, a compact structure is provided and inductance of the wire is reduced, which is preferable.

Next, the structure of wiring connection having such three layer structure will be described further in detail.

Figure 18:
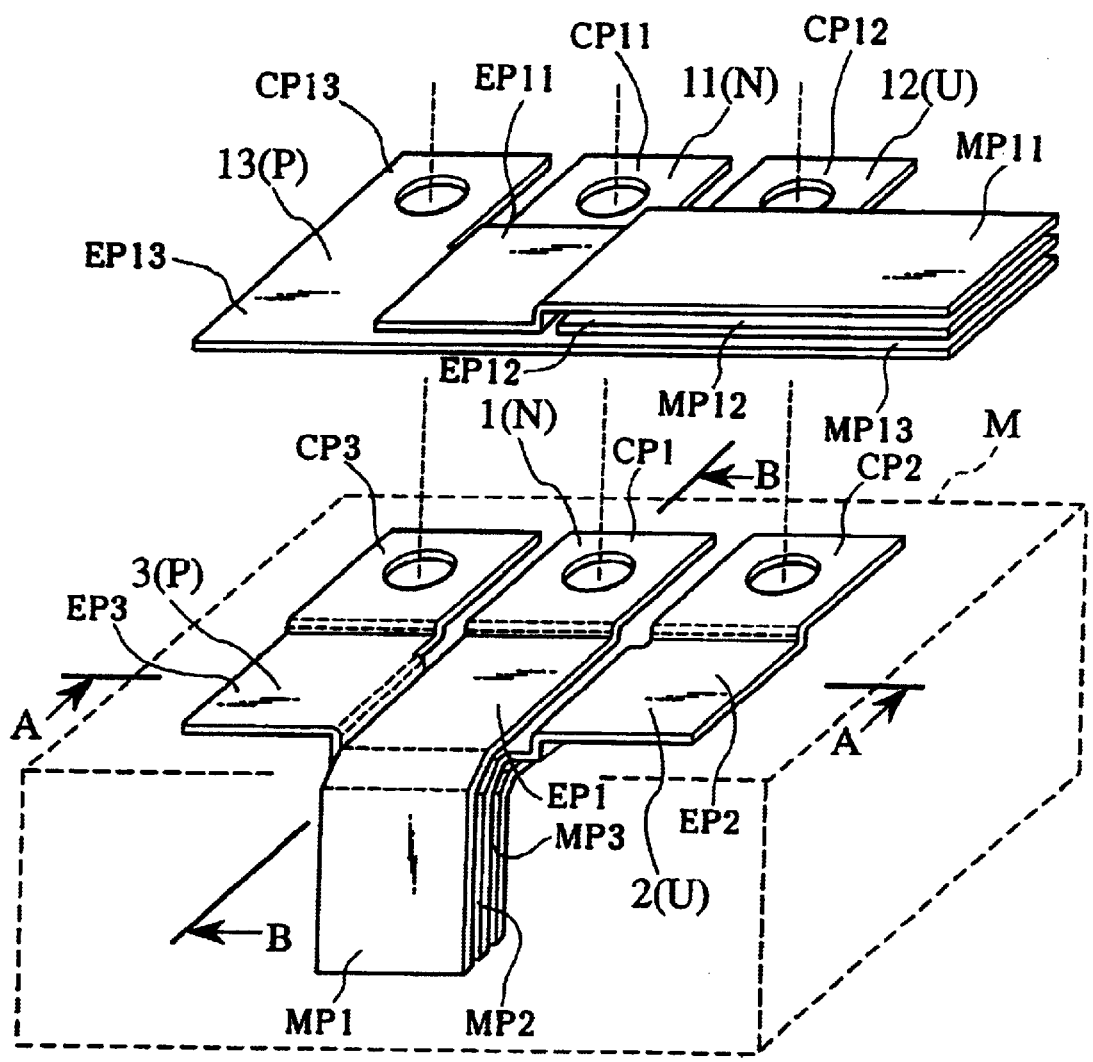
FIG. 18 is a perspective view showing a concrete example of the embodiment.

FIG. 18 is a diagram in which a power transistor module in U phase and an external wiring connected thereto in FIG. 17 are drawn.

Referring to FIG. 18, the respective wires are layered in the order of P, U, and N outside the power transistor module M so that magnetic fields generated by respective wires are cancelled by the other thereby reducing wiring inductance. On the other hand, the connecting portion of the bus bar of an internal wiring is exposed on the surface of the power transistor module M. Although here, the arrangement in the connecting portion is in the order of P, N and U like a general power transistor module, of course, the order of P, U and N is permissible.

More specifically, reference numerals 1, 2, 3 in FIG. 18 denote bus bars of internal wirings corresponding successively to the wires P, U, N and the bus bars 1, 2 and 3 correspond to the first, second and third wires. Further, the bus bars 11, 12 and 13 are bus bars of external wires corresponding thereto and correspond to fourth, fifth and sixth wires. The connecting portion of each bus bar has a fastening hole. The dashed line connecting the holes in the same figure indicates a correspondence relation.

With such a structure, an insulating plate is sandwiched between the bus bars 1, 2, 3 and 13 at a portion except the fastening portion so as to ensure insulation upon connection. That is, the connecting portion of the bus bar 1 is connected to the connecting portion of the bus bar 12 such that they are in contact with each other through a predetermined area. The connecting portion of the bus bar 2 is connected to the connecting portion of the bus bar 12 such that they are in contact with each other through a predetermined area. The connection portion of the bus bar 3 is connected to the connecting portion of the bus bar 13 such that they are in contact with each other through a predetermined area. Because these connecting portions are to be connected with bolts and nuts, they can be detached.

Figure 19:
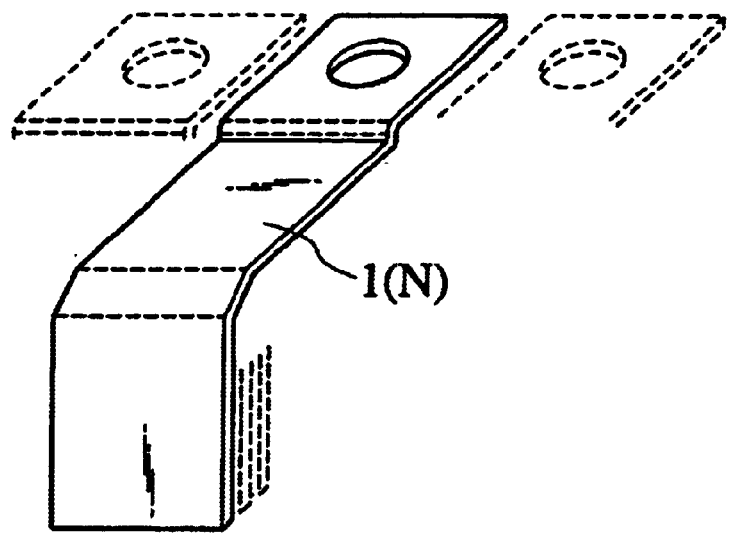
FIG. 19 is a perspective view showing part of the structure shown in FIG. 18.
Figure 20:
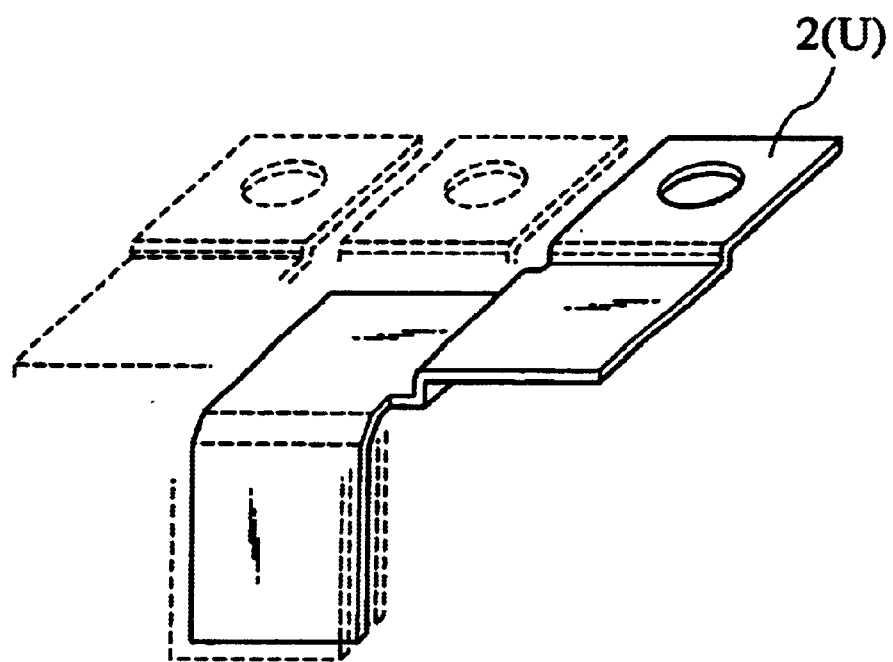
FIG. 20 is a perspective view showing part of the structure shown in FIG. 18.
Figure 21:
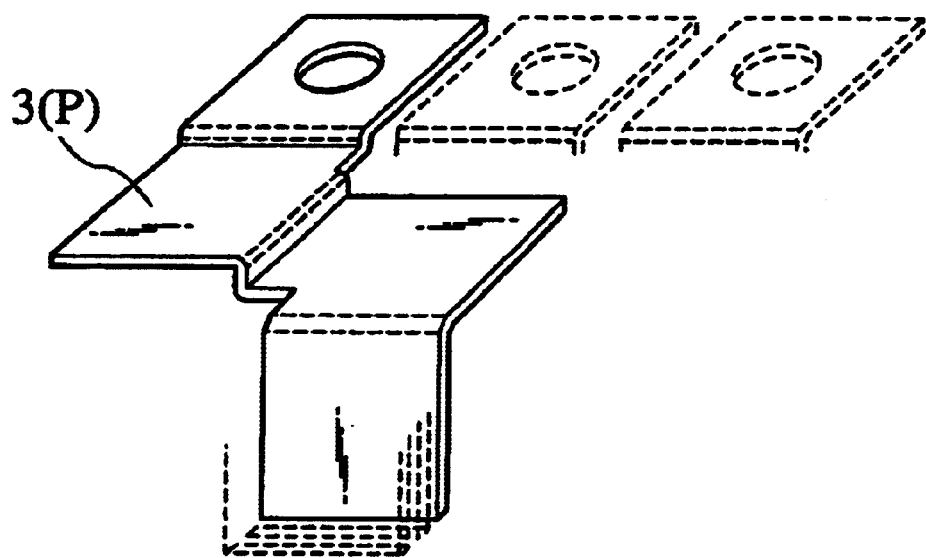
FIG. 21 is a perspective view showing part of the structure shown in FIG. 18.
Figure 22:
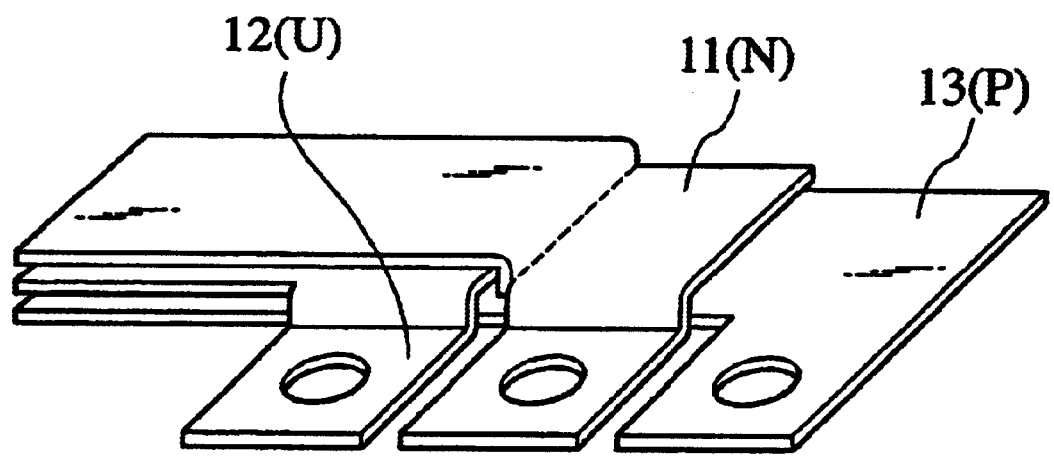
FIG. 22 is a perspective view showing part of the structure shown in FIG. 18.

The structure of each of the bus bars 1, 2 and 3 is correspondingly shown in each of FIG. 19 to FIG. 21 so as to explain the wiring structure further in detail. FIG. 22 shows a view taken from the opposite side about the bus bars 11, 12 and 13 of the external wires.

Figure 23:
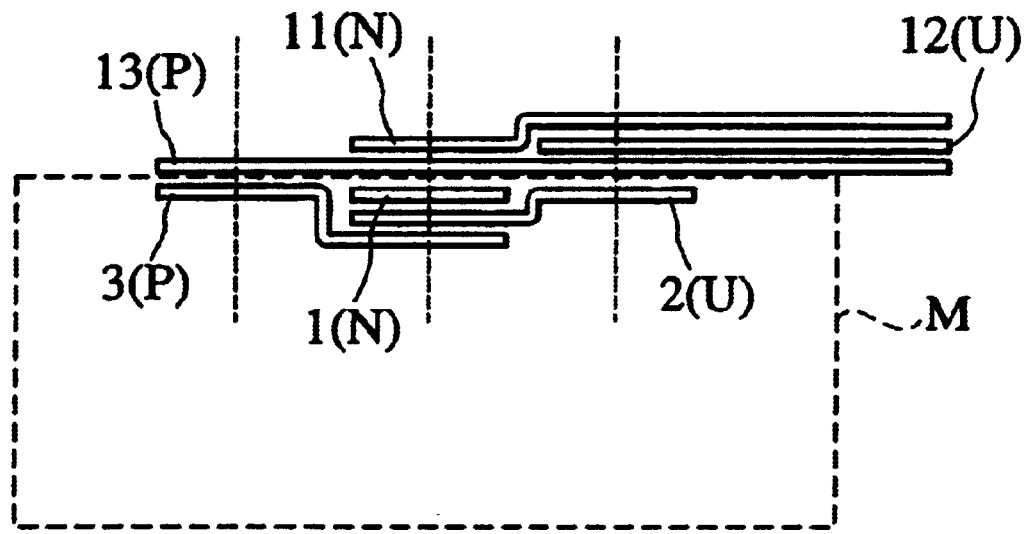
FIG. 23 is a sectional view taken at right angle to the surface of a power transistor module along the line A—A in FIG. 18.
Figure 24:
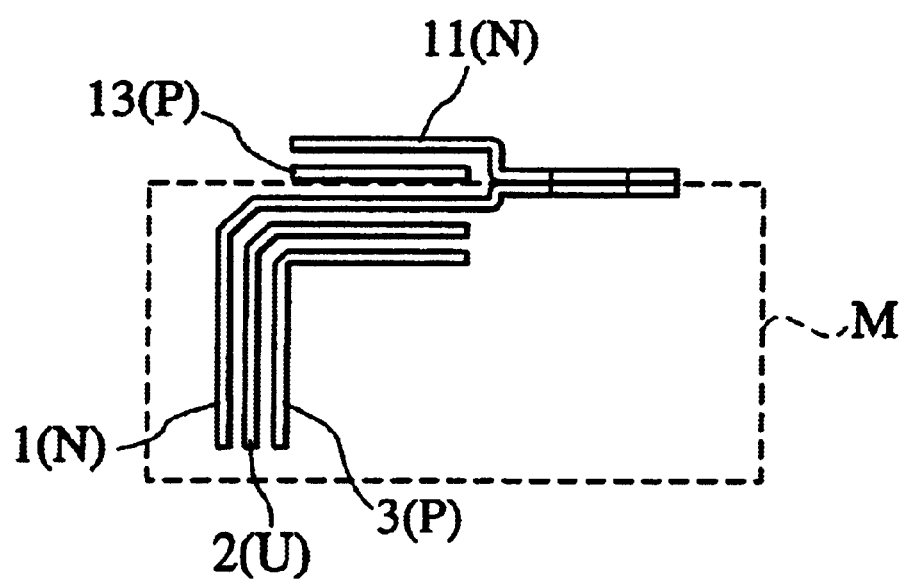
FIG. 24 is a sectional view taken at right angle to the surface of a power transistor module along the line B—B in FIG. 18.

FIG. 23 shows a sectional view cut along a plane vertical to the surface of the power transistor module through the lines A—A as viewed in the direction of an arrow. Further, FIG. 24 shows a sectional view cut along a plane vertical to the surface of the power transistor module through the lines B—B in FIG. 18. In the meantime, in FIG. 23 and FIG. 24, the bus bars are drawn in a condition that they are in contact with each other for convenience for explanation.

In a power transistor module shown in FIG. 18, only the fastening portion of the connecting portion is exposed on the surface of the power transistor module and its following portion is covered with a thin insulating plate so that it is not exposed on the surface of the power transistor module. As a result, as for a bus bar of a corresponding external wiring, a general structure bus bar not having the structure of this embodiment can be also coupled. Instead of this, it is permissible to make such portions exposed as shown in FIG. 25 and for the bus bars of the external wiring to contain an insulating plate 10.

Figure 26:
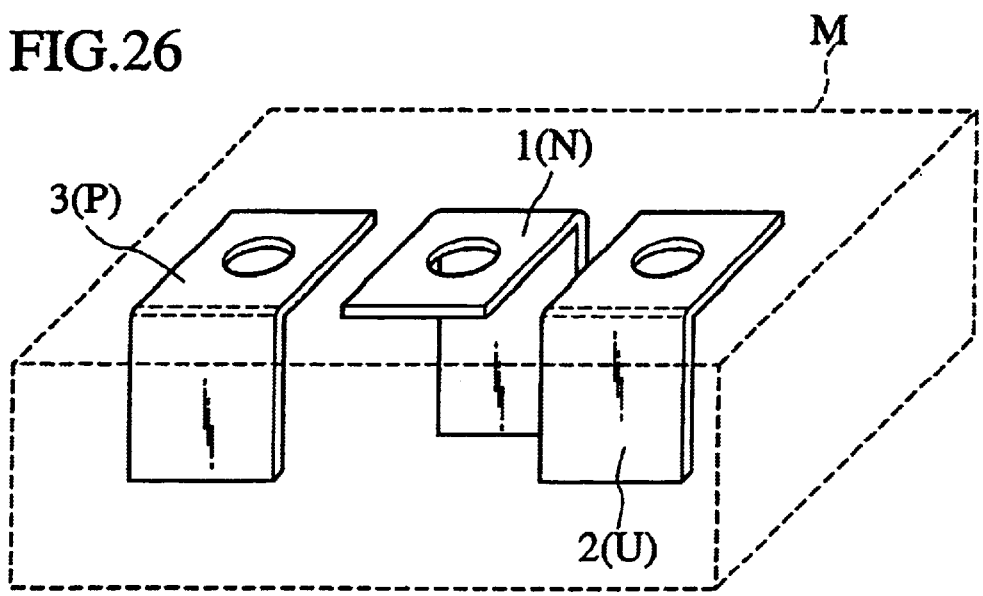
FIG. 26 is a perspective view showing part of a structure of wiring connection as a comparative example in the embodiment.

Generally speaking, in the bus bar of the internal wiring in the power transistor module, as shown in FIG. 26, only the fastening portions of the bus bars 1, 2 and 3 are exposed on the surface of the power transistor module and following portions do not overlap, such that they are disposed separately. Under such a structure, however the bus bars of the external wirings are constructed, there is a limit for reduction of inductance in the connecting portion.

Figure 25:
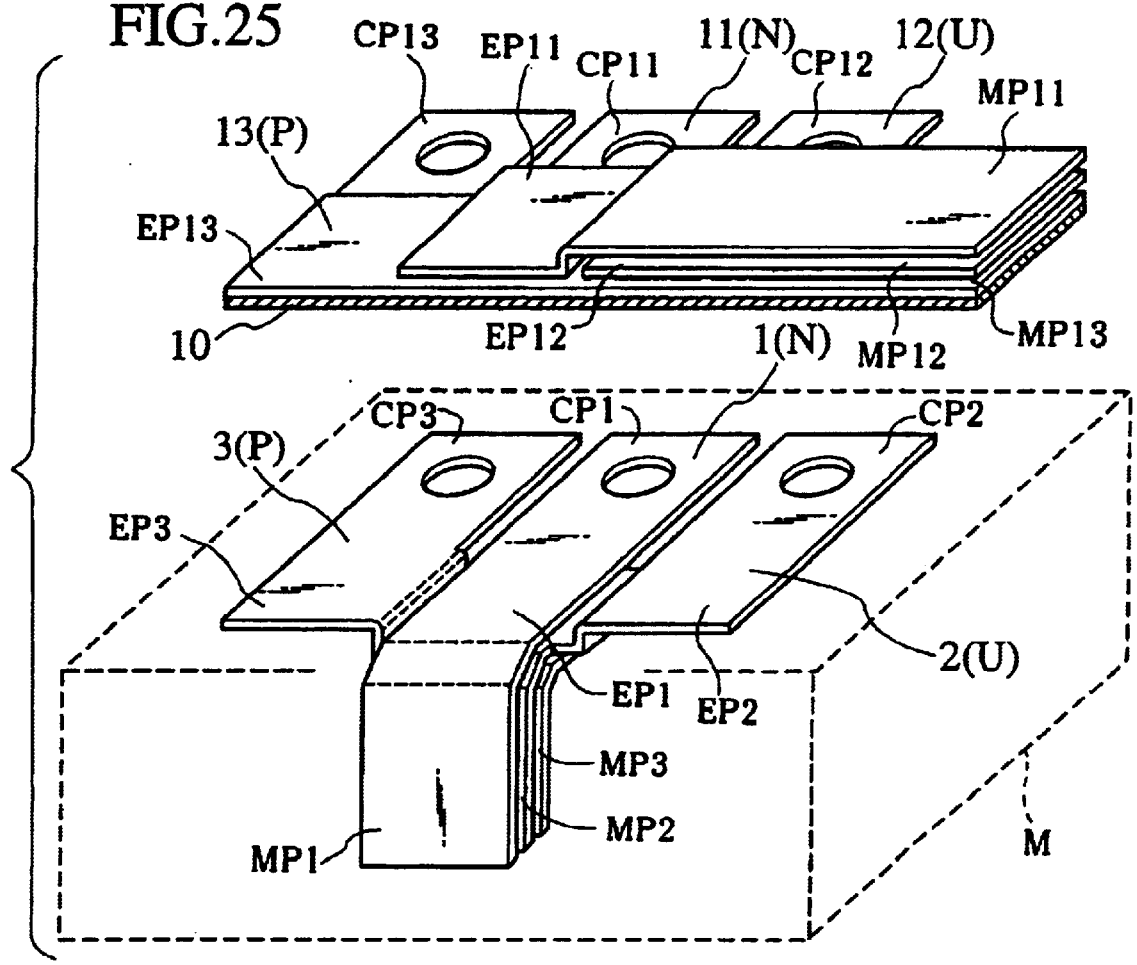
FIG. 25 is a perspective view showing a concrete example of the embodiment.

However, if the connecting structure shown in FIG. 18 or FIG. 25 is employed in this embodiment, inductance thereof can be reduced to a further extent.

That is, with such a structure, each elbow portion EP1, EP2, EP3, EP11, EP12 or EP13 is preferably provided, and any position to be included in the main portion MP1, MP2, MP3, MP11, MP12 or MP13, the connecting portion CP1, CP2, CP3, CP11, CP12 or CP13, and the elbow portion of any one of the bus bars 1, 2, 3, 11, 12, and 13, faces to at least one of the other bus bars such that the specific distance thereof is less than the width of each of the bus bars 1, 2, 3, 11, 12 and 13. Also, the main portions of the bus bars 1, 2 and 3 run together in parallel with a three layer structure, such that the main faces thereof face to each other and the specific distance thereof is less than the width of each of the bus bars 1, 2 and 3. Also, the main portions of the bus bars 11, 12 and 13 run together in parallel with a three layer structure, such that the main faces thereof face to each other and the specific distance thereof is less than the width of each of the bus bars 11, 12 and 13. With such a structure, inductance in the connecting structure can be reduced to further extent.

Besides, if three bus bars are used so as to construct a circuit shown in FIG. 17, even if there is an increase in inductance in two current paths in the connecting portions, the increase between P and U is desired to be equal to that between U and N.

If the structure shown in FIG. 18 is considered from such a standpoint, it can be said that the relation between inductances has been almost established. For example, the inductances between P and U and between U and N can be evaluated in a following manner.

Figure 27:
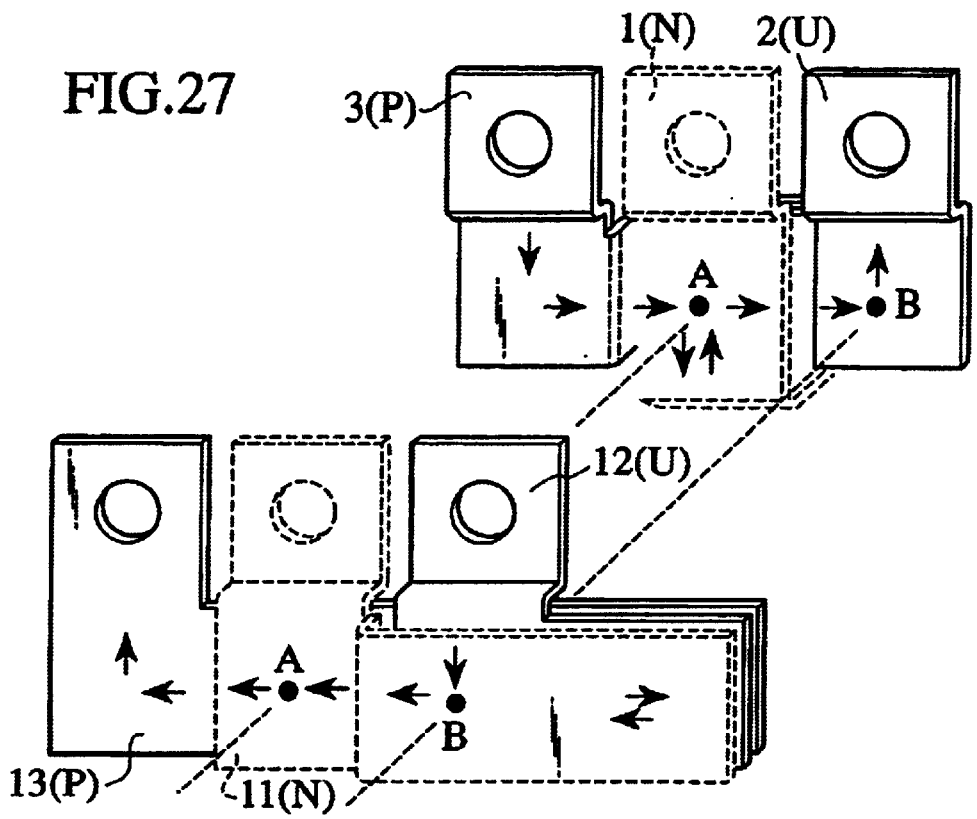
FIG. 27 is a perspective view for explaining a flow of current in the structure shown in FIG. 18.
Figure 28:
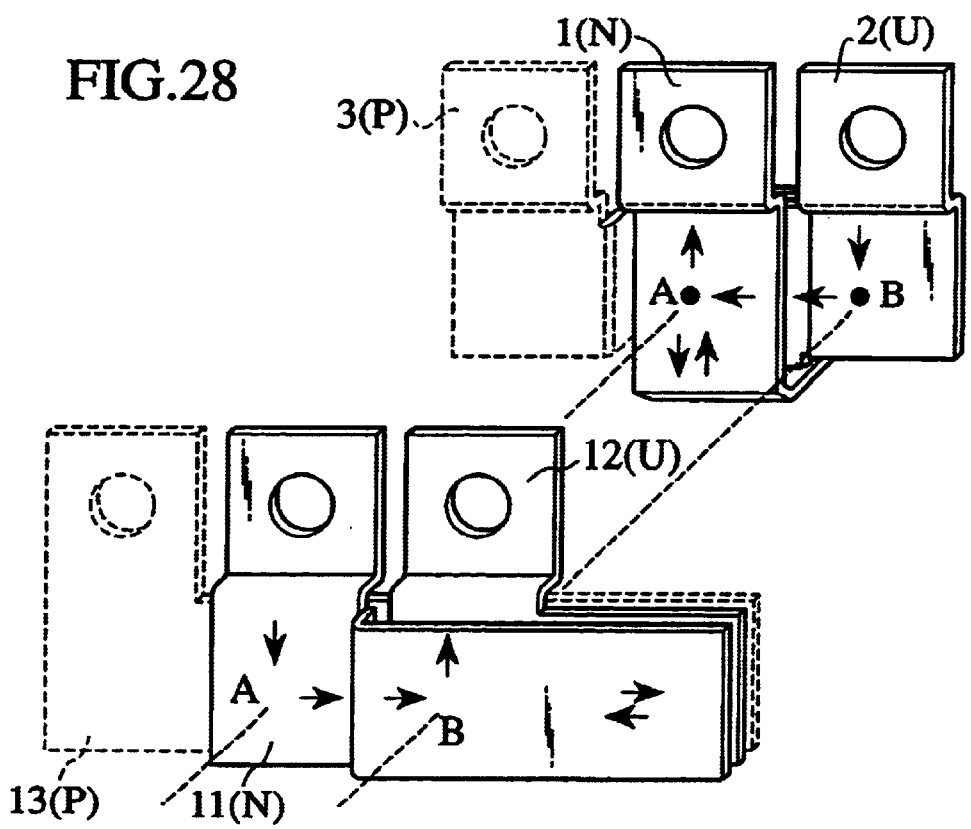
FIG. 28 is a perspective view for explaining a flow of current in the structure shown in FIG. 18.
Figure 29:
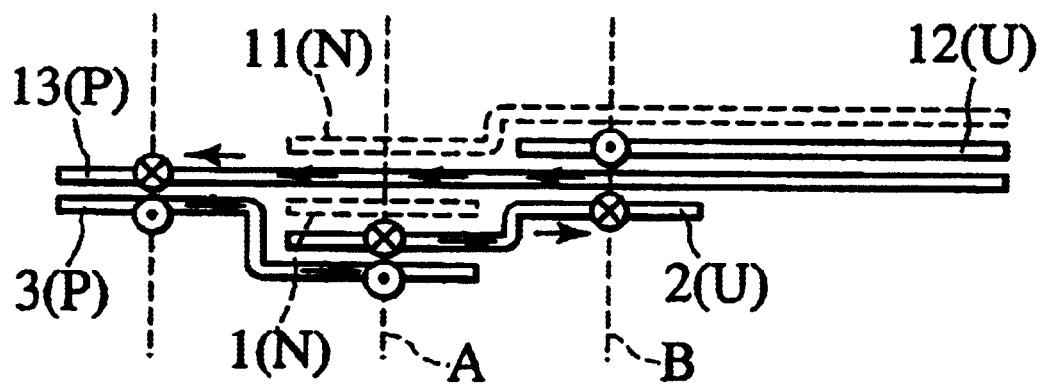
FIG. 29 is a sectional view obtained in the same way as FIG. 23 for showing a flow of current in FIG. 27.
Figure 30:
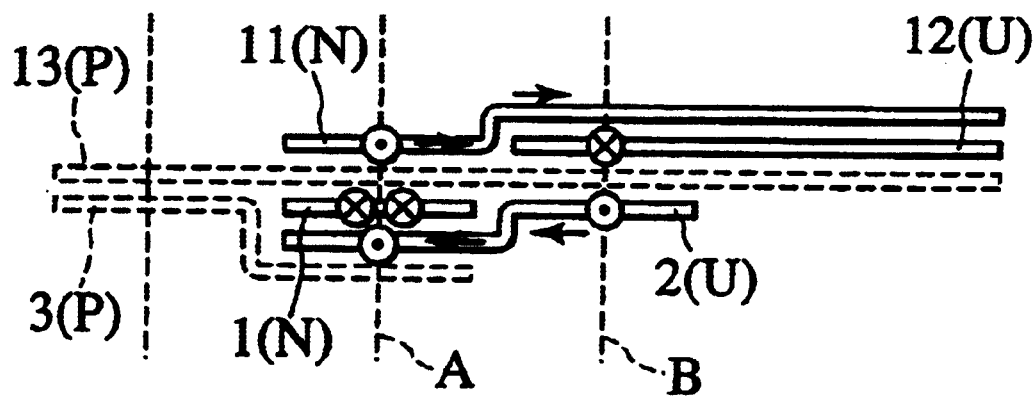
FIG. 30 is a sectional view obtained in the same way as FIG. 23 for showing a flow of current in FIG. 28.

FIG. 27 and FIG. 28 are perspective views for explaining flows of currents between P and U and between U and N in FIG. 18. FIG. 29 and FIG. 30 are the same sectional views as FIG. 23 and arrows in FIG. 29 and FIG. 30 indicate current flow, more specifically current flows between P and U, and between U and N. In these figures, the length of each arrow indicates the magnitude corresponding to half the width of a corresponding bus bar. Because small currents which may be generated are negligible, a representation thereof is omitted.

In FIG. 29 and FIG. 30, a "symbol of a circle containing a dot therein" and a "symbol containing a cross therein" are the same as vector notation, which mean a "direction coming to this way" and a "direction going to that way", both directions being at right angle to the paper. In FIG. 29 and FIG. 30, the point A indicates schematically a point where the wires running together in parallel (or currents flowing therein) in the "main portions" of the bus bars 1, 2 and 3 of internal wirings become unparalleled toward the "connecting portions" or a branch position. The point B corresponds to a position containing the same meaning as the point A in the bus bars 11, 12 and 13 of the external wirings.

In case where the specific distance is small, inductance of wire portions where opposing currents flow is proportional to the specific distance. Therefore, if distances between corresponding arrows in FIG. 27 to FIG. 30 are integrated, a substantially accurate inductance can be obtained.

More specifically, assuming that the thickness of the bus bar is a and the distance between the bus bars is b, the specific distance is (a+b). If the quantity of opposing arrows from a point A to a point B between the bus bar 3 and the bus bar 13 and between the bus bar 2 and the bus bar 12 is counted, it is 10. Then, if a distance between such arrows is integrated, a value proportional to partial inductance from the point A to the point B between P and U can be obtained. In this example, (10a+10b)=10×(a+b) can be calculated. Here, this is assumed to be noted as unit of 10. If a condition of current between U and N is integrated, it comes that it is also unit of 10.

Therefore, it is evident that increases of inductance at both the connecting portions and the elbow portions between P and U and between U and N are substantially equal.

Next, in the structure of the connecting portion of such three layered bus bars, a pattern in which each bus bar is extended will be described with reference to FIG. 31A to FIG. 31D. In the meantime, notations in the same figures are the same as FIG. 6A to FIG. 6C.

Figure 31A:
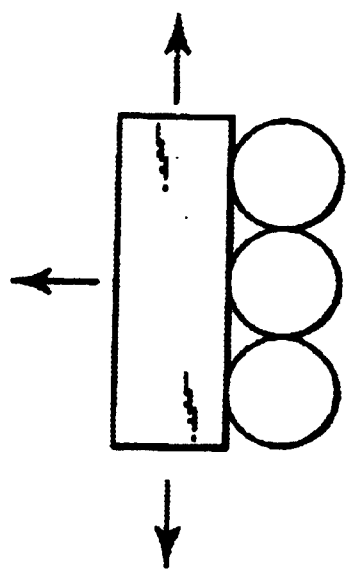
FIGS. 31A to 31D are schematic diagrams for explaining variation of the embodiment.
Figure 31B:
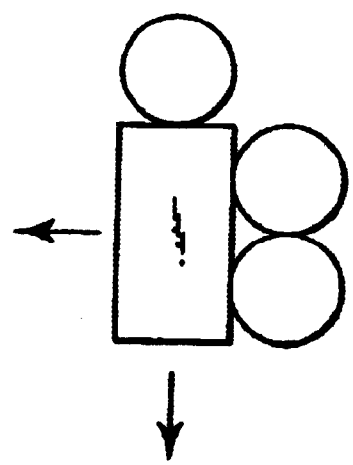
Figure 31C:
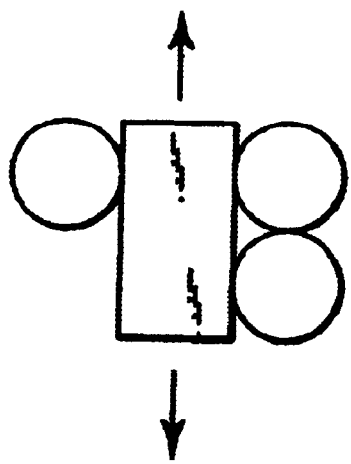
Figure 31D:
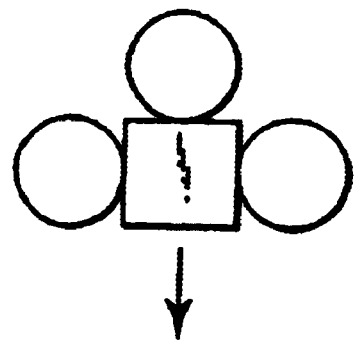
Figure 32:
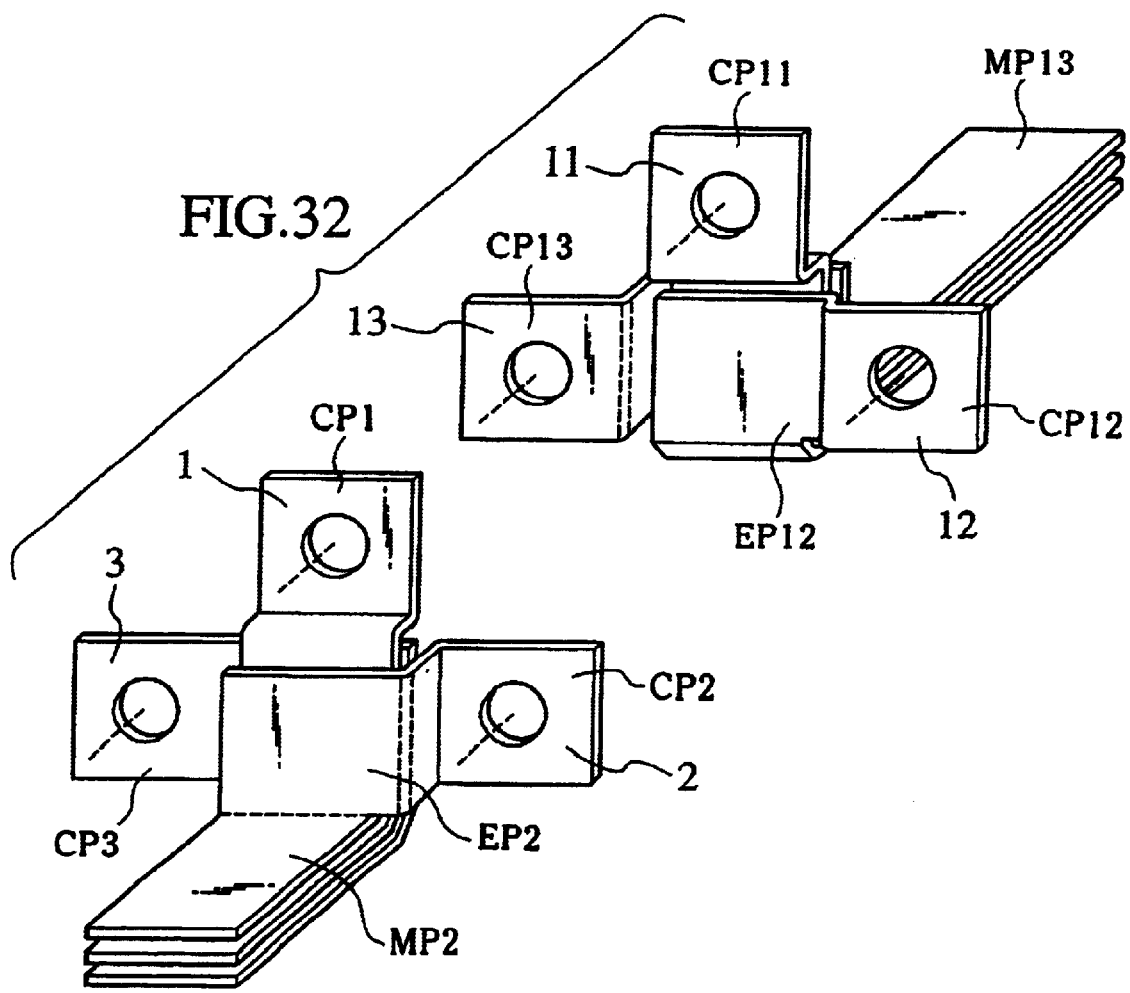
FIG. 32 is a perspective view showing a concrete example of the embodiment.

More specifically, FIG. 18 shows an embodiment of a pattern in which the bus bar in FIG. 31A is extended. FIG. 32 shows an embodiment of a pattern in which the bus bar in FIG. 31D is extended. Patterns shown in FIG. 31B and FIG. 31C can be appropriately considered. Further, by considering whether or not arrangement of the bus bars is inverted by connection and whether the arrangement of the connecting terminals is P-N-U or P-U-N, a variety of patterns can be obtained.

Next, an example in which an integrated value of distances between arrows indicating a condition of current flow is unequal will be considered.

Figure 33:
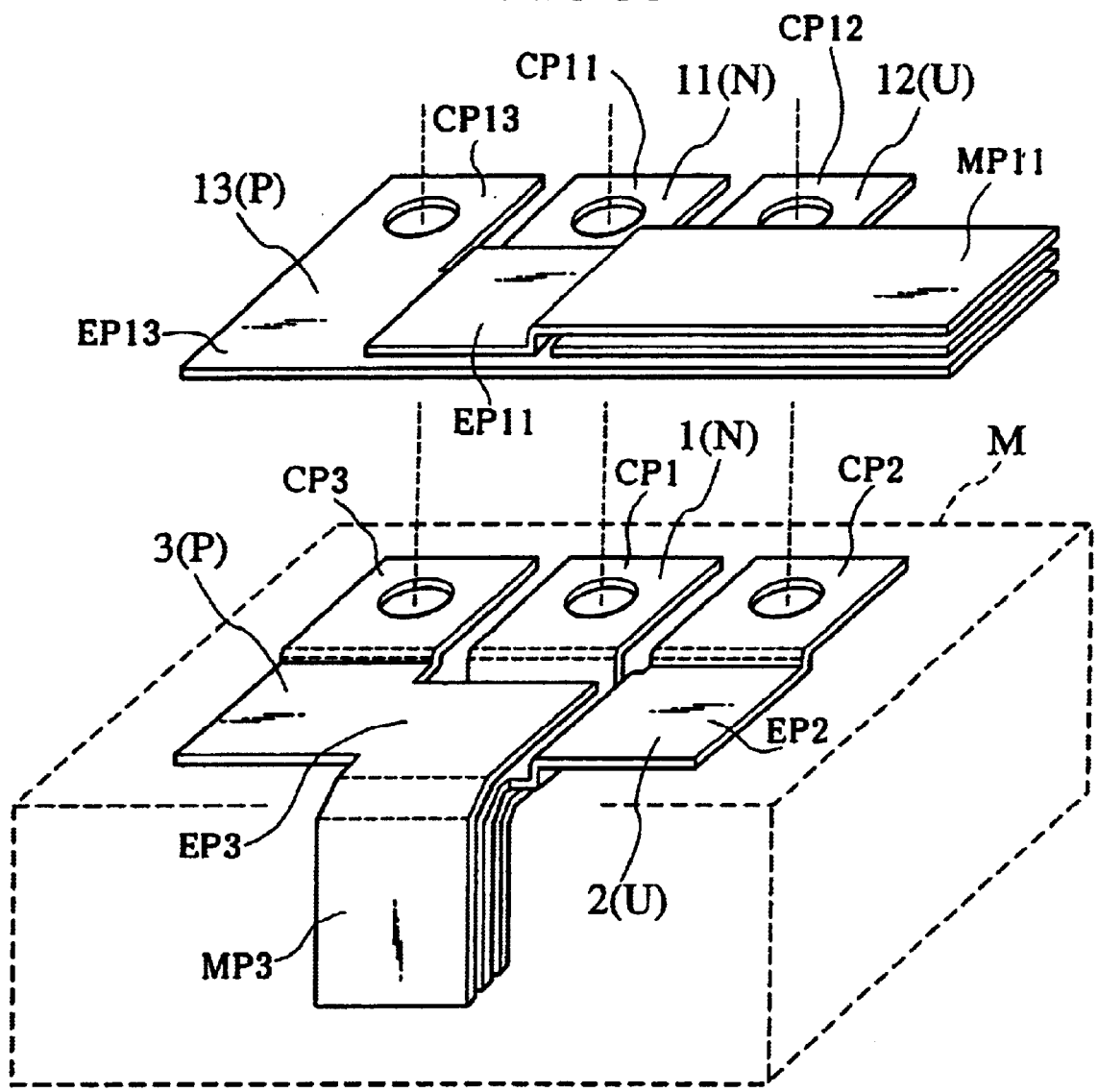
FIG. 33 is a perspective view showing a concrete example of the embodiment.
Figure 34:
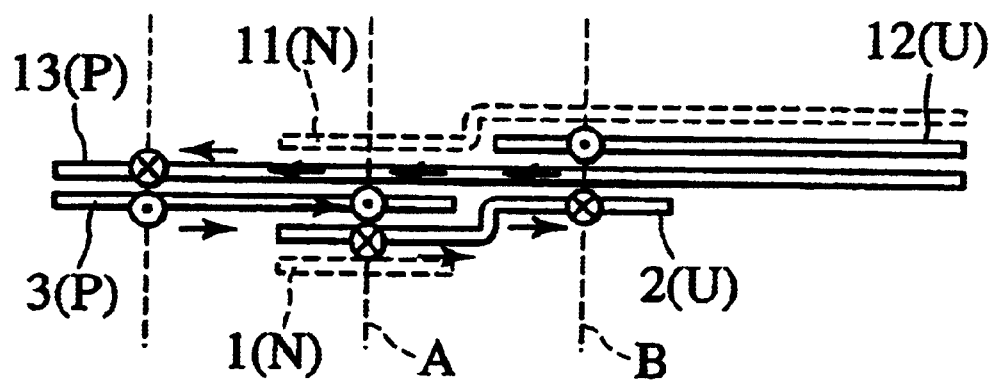
FIG. 34 is a sectional view obtained in the same way as FIG. 29 for showing a flow of current in FIG. 33.
Figure 35:
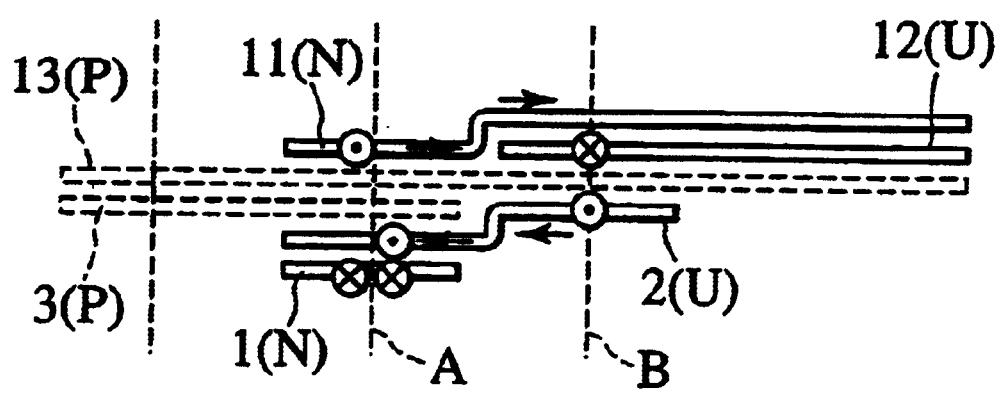
FIG. 35 is a sectional view obtained in the same way as FIG. 30 for showing a flow of current in FIG. 33.

Referring to FIG. 33, the layer arrangement of the bus bars inside the power transistor module is inverse in a vertical direction to the structure of FIG. 18 and therefore, branching ways of the three bus bars are different. In such a structure, the same sectional views as FIG. 29 and FIG. 30 are expressed as shown in FIG. 34 and FIG. 35. In such a case, if the same integration as calculation using FIG. 27 to FIG. 30 is carried out, it comes that unit of 8 is provided between P and U and unit of 12 is provided between U and N.

If such an inductance difference is generated, as a method for fine adjustment for reducing that difference, following methods are available.

Figure 36:
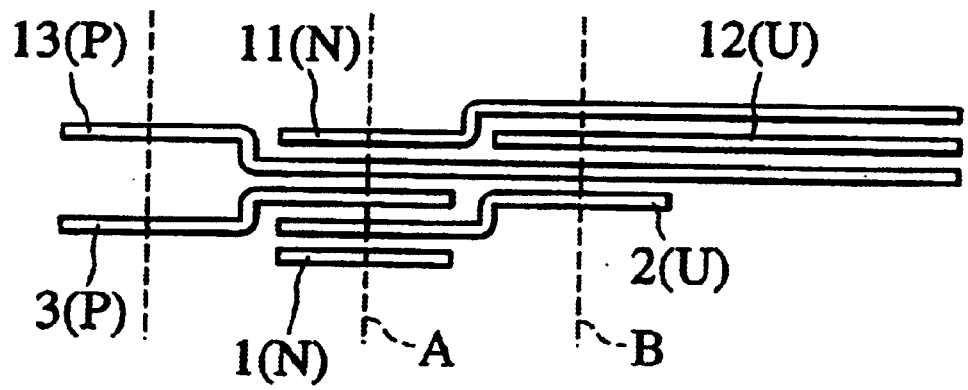
FIG. 36 is a sectional view showing a structure of wiring connection allowing adjustment of inductance according to the embodiment.

According to a first adjustment method, because integrated inductance is low on the side of P–U as shown in FIG. 36, intentionally, a gap between the bus bar 3 and the bus bar 13 is adjusted appropriately so as to carry out fine adjustment of inductance.

Figure 37:
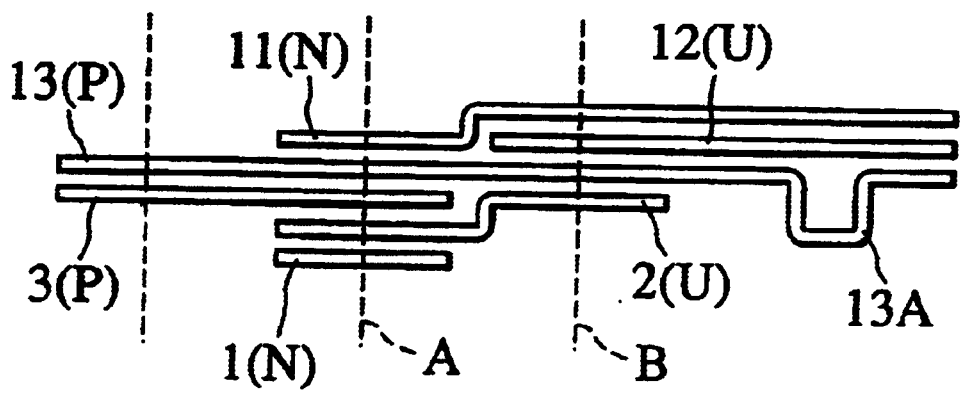
FIG. 37 is a sectional view showing a structure of wiring connection allowing adjustment of inductance according to the embodiment.
Figure 38:
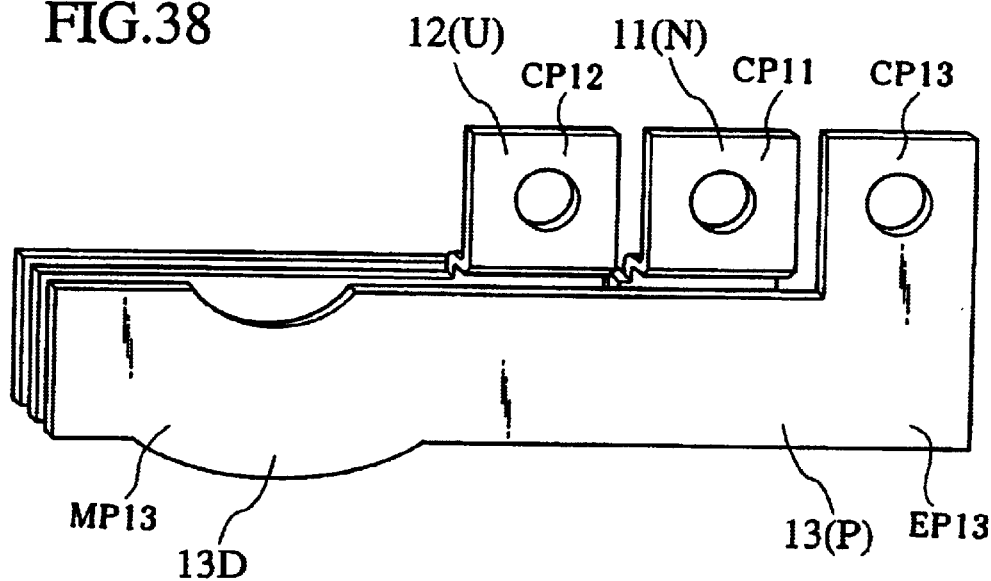
FIG. 38 is a sectional view showing a structure of wiring connection allowing adjustment of inductance according to the embodiment.

According to a second adjustment method, the bus bar of side P is provided with a curved portion 13A which is curved in a direction vertical to the main face of the bus bar as shown in FIG. 37 or a curved region 13D which is curved in a direction parallel to the main face of the bus bar as shown in FIG. 38, thereby providing with a portion for locally increasing the specific distance. That is, under these structures, part of the bus bar 11 and the bus bar 13 is provided with a curved portion or a curved region so that inductance between wires when opposing current flow through the bus bar 1 and the bus bar 2 is substantially equal to inductance between wires when opposing currents flow through the bus bar 2 and the bus bar 3. Consequently, by adjusting the specific distance in such a curved portion or curved region by combination with the length thereof in a direction of extension of the bus bar appropriately, inductances can be substantially equalized. In the meantime, a position where the curved portion 13A or the curved region 13D is provided is not restricted to a position shown in the same figure, but they may be provided in the vicinity of each fastening portion.

The structure in which the bus bars are kept separate to each other according to the first adjustment method and the structure in which the curved portion 13A is provided according to the second adjustment method have the same meaning as employing a structure for adjusting the thickness of an insulating layer between the bus bars such that it is locally thick.

Figure 39:
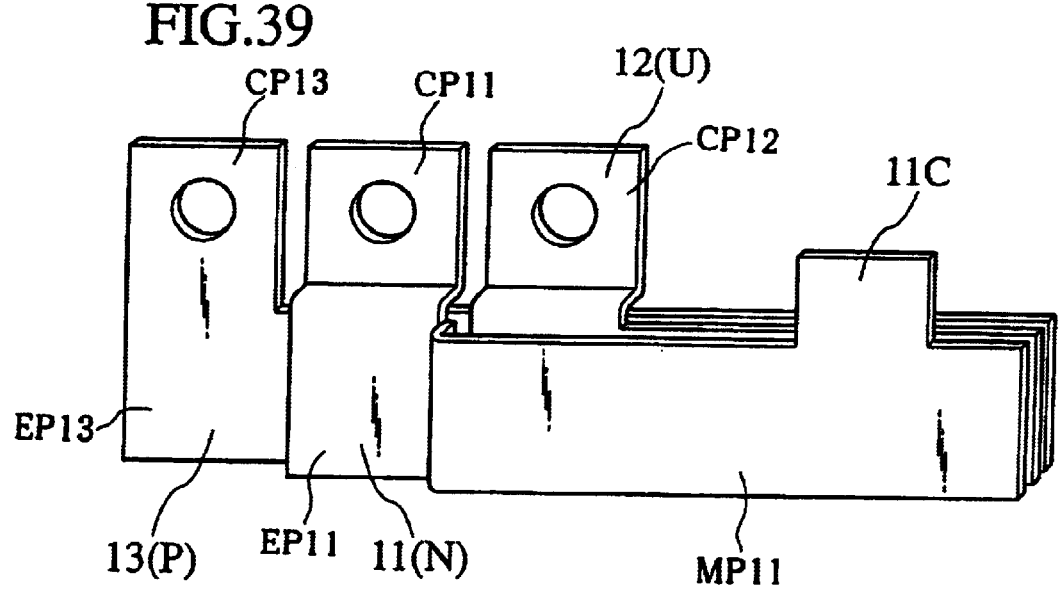
FIG. 39 is a sectional view showing a structure of wiring connection allowing adjustment of inductance according to the embodiment.
Figure 40:
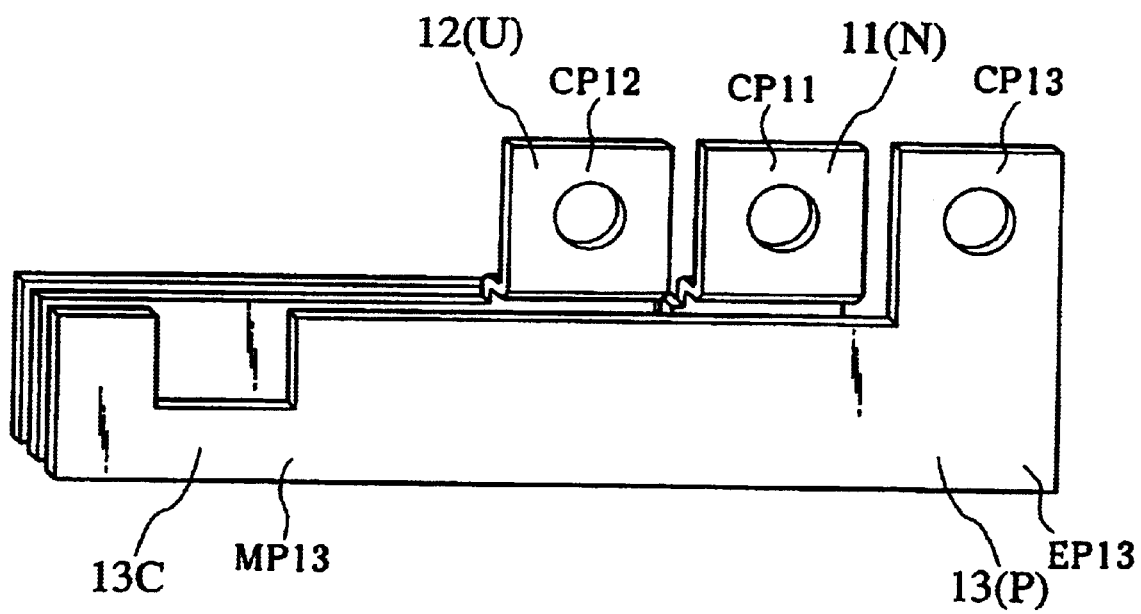
FIG. 40 is a sectional view showing a structure of wiring connection allowing adjustment of inductance according to the embodiment.

According to a third adjustment method, a wide region 11 11C is provided in the bus bar 11 on the side of N as shown in FIG. 39 or a narrow region 13C is provided in the bus bar 13 on the side of P as shown in FIG. 40. Although in these diagrams, a region in which the width of the bus bar is changed is provided on a side of the bus bar, of course, it is permissible to provide it on an opposite side or on both sides. That is, part of each of the bus bar 11 and the bus bar 13 is provided with a region in which the width of the plate is changed so that inductance between wires when opposing currents flow through the bus bar 1 and the bus bar 2 is substantially equal to inductance between wires when opposing currents flow through the bus bar 2 and the bus bar 3. This is based on a correlation that if a partial plate width is relatively reduced as compared to the plate width of the surrounding, inductance of that portion is increased. The same tendency appears in case where the changes of the plate width are equal on both sides of the plate and in case where the width is changed eccentrically on one side.

Figure 41:
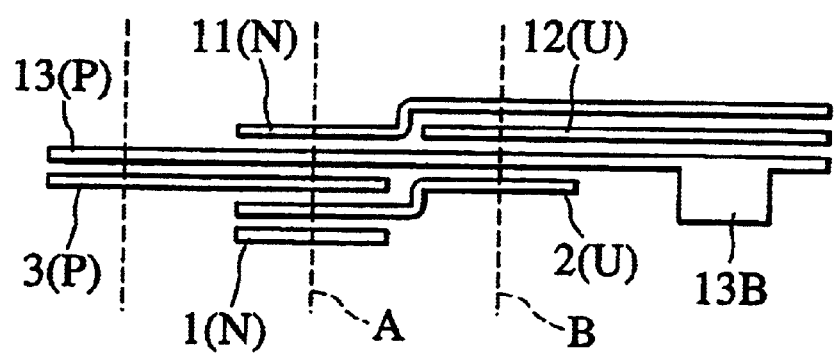
FIG. 41 is a sectional view showing a structure of wiring connection allowing adjustment of inductance according to the embodiment.

According to a fourth adjustment method, a conductive plate 13B is attached to part of the bus bar 13 as shown in FIG. 41 so as to increase the plate width locally. Part of the bus bar 13 is provided with a plate thickness changing region in which the plate thickness is increased so that inductance between wires when opposing currents flow through the bus bar 1 and the bus bar 2 is equal to inductance between wires when opposing currents flow through the bus bar 2 and the bus bar 3. By attaching this conductive plate 13B, the specific distance at that portion is increased, thereby making it possible to carry out fine adjustment of inductance. Of course, the region in which the plate thickness is increased may be integrated with the bus bar or so constructed that a detachable conductor is mounted thereon with bolts and nuts. If the detachable structure is employed, adjustment of inductance is enabled even after the bus bar is installed on a device.

Although the respective embodiments have been described on an assumption that the bus bar 1 and the bus bar 2 correspond to the first, second wires for convenience for description, of course, it is possible to interpret that the bus bar 1 and the bus bar 2 correspond to third, fourth wires while the bus bar 11 and the bus bar 12 correspond to the first, second wires.

Further, although the respective embodiments have been described on an assumption that the bus bars 1, 2 and 3 correspond to the first, second, third wires while the bus bars 11, 12 and 13 correspond to fourth, fifth, sixth wires for convenience for the description, of course, it is possible to interpret that the bus bars 1, 2 and 3 correspond to the fourth, fifth, sixth wires while the bus bars 11, 12 and 13 correspond to the first, second, third wires.

The entire content of a Patent Application No. TOKUGAN 2000-212467 with a filing date of Jul. 13, 2000 in Japan is hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A structure of wiring connection comprising:

a first wiring that extends in a first direction as a narrow plate having two main faces respectively defined by the first direction and a direction crossing thereto to have a predetermined plate width, and in the first direction, provided with a main portion, at least one connecting portion and an elbow portion defined as a portion between the main portion and the connecting portion thereof, a second wiring that extends in a second direction as a narrow plate having two main faces respectively defined by the second direction and a direction crossing thereto to have a predetermined plate width, and in the second direction, provided with a main portion, at least one connecting portion and an elbow portion defined as a portion between the main portion and the connecting portion thereof, a third wiring that extends in a third direction as a narrow plate having two main faces respectively defined by the third direction and a direction crossing thereto to have a predetermined plate width, and in the third direction, provided with a main portion, at least one connecting portion and an elbow portion defined as a portion between the main portion and the connecting portion thereof, the connecting portion of the first wiring and the connecting portion of the third wiring being in contact with each other through a predetermined area; and a fourth wiring that extends in a fourth direction as a narrow plate having two main faces respectively defined by the fourth direction and a direction crossing thereto to have a predetermined width, and in the fourth direction, provided with a main portion, at least one connecting portion and an elbow portion defined as a portion between the main portion and the connecting portion thereof, the connecting portion of the second wiring and the connecting portion of the fourth wiring being in contact with each other through a predetermined area, wherein between any one of the first wiring to the fourth wiring and one of the other wirings, a specific distance defined as a distance between gravity centers in sections of two corresponding wirings of the first wiring to the fourth wiring cut along a plane vertical to each main face of the two corresponding wirings is less than the predetermined plate width of each of the two corresponding wirings, and wherein the main portion of the first wiring and the main portion of the second wiring run together in parallel facing each one of main faces thereof, and the main portion of the third wiring and the main portion of the fourth wiring run together in parallel facing each one of main faces thereof.

2. A structure of wiring connection according to claim 1, wherein each predetermined plate width of the first wiring to the fourth wiring is the same width.

3. A structure of wiring connection according to claim 1, wherein the elbow portion of the first wiring and that of the third wiring are in contact with each other, and the elbow portion of the second wiring and that of the fourth wiring are in contact with each other.

4. A structure of wiring connection according to claim 1, wherein the elbow portion of the first wiring and that of the third wiring are in contact with each other to be sandwiched between the elbow portion of the second wiring and that of the fourth wiring.

5. A structure of wiring connection according to claim 1, wherein a part of the elbow portion of the first wiring and that of the third wiring are in contact with each other, and another part of the elbow portion of the first wiring is sandwiched between the elbow portion of the second wiring and that of the fourth wiring.

6. A structure of wiring connection according to claim 1, wherein each connecting portion of the first wiring to the fourth wiring is detachable from a corresponding connecting portion thereof.

7. A structure of wiring connection comprising:

a first wiring that extends in a first direction as a narrow plate having two main faces respectively defined by the first direction and a direction crossing thereto to have a predetermined plate width, and in the first direction, provided with a main portion, at least one connecting portion and an elbow portion defined as a portion between the main portion and the connecting portion thereof, a second wiring that extends in a second direction as a narrow plate having two main faces respectively defined by the second direction and a direction crossing thereto to have a predetermined plate width, and in the second direction, provided with a main portion, at least one connecting portion and an elbow portion defined as a portion between the main portion and the connecting portion thereof, a third wiring that extends in a third direction as a narrow plate having two main faces respectively defined by the third direction and a direction crossing thereto to have a predetermined plate width, and in the third direction, provided with a main portion, at least one connecting portion and an elbow portion defined as a portion between the main portion and the connecting portion thereof;

a fourth wiring that extends in a fourth direction as a narrow plate having two main faces respectively defined by the fourth direction and a direction crossing thereto to have and having a predetermined plate width, and in the fourth direction, provided with a main portion, at least one connecting portion and an elbow portion defined as a portion between the main portion and the connecting portion thereof, the connecting portion of the first wiring and the connecting portion of the fourth wiring being in contact with each other through a predetermined area;

a fifth wiring that extends in a fifth direction as a narrow plate having two main faces respectively defined by the fifth direction and a direction crossing thereto to have a predetermined width, and in the fifth direction, provided with a main portion, at least one connecting portion and an elbow portion defined as a portion between the main portion and the connecting portion thereof, the connecting portion of the second wiring and the connecting portion of the fifth wiring being in contact with each other through a predetermined area; and a sixth wiring that extends in a sixth direction as a narrow plate having two main faces respectively defined by the sixth direction and a direction crossing thereto to have a predetermined width, and in the sixth direction, provided with a main portion, at least one connecting portion and an elbow portion defined as a portion between the main portion and the connecting portion thereof, the connecting portion of the third wiring and the connecting portion of the sixth wiring being in contact with each other through a predetermined area;

wherein between any one of the first wiring to the sixth wiring and one of the other wirings, a specific distance defined as a distance between gravity centers in sections of two corresponding wirings of the first wiring to the sixth wiring cut along a plane vertical to each main face of the two corresponding wirings is less than the predetermined plate width of each of the two corresponding wirings, and wherein the main portion of the first wiring, the main portion of the second wiring and the main portion of the third wiring run together in parallel facing each one of main faces thereof, and the main portion of the fourth wiring, the main portion of the fifth wiring and the main portion of the sixth wiring run together in parallel facing each one of main faces thereof.

8. A structure of wiring connection according to claim 7, wherein each predetermined plate width of the first wiring to the sixth wiring is the same width.

9. A structure of wiring connection according to claim 7, wherein the first wiring is provided with a region where part thereof is curved such that when the first wiring to the sixth wiring are in a circuit system, and the fourth wiring and the fifth wiring are connected with each other at somewhere therein, inductance for a current through the first wiring, the fourth wiring, the fifth wiring and to the second wiring is equal to inductance for a current through the third wiring, the sixth wiring, the fifth wiring and to the second wiring.

10. A structure of wiring connection according to claim 7, wherein part of the first wiring is provided with a region where the plate width thereof is changed such that when the first wiring to the sixth wiring are in a circuit system, and the fourth wiring and the fifth wiring are connected with each other at somewhere therein, inductance for a current through the first wiring, the fourth wiring, the fifth wiring and to the second wiring is equal to inductance for a current through the third wiring, the sixth wiring, the fifth wiring and to the second wiring.

11. A structure of wiring connection according to claim 7, wherein part of the first wiring is provided with a region where plate thickness thereof is increased such that when the first wiring to the sixth wiring are in a circuit system, and the fourth wiring and the fifth wiring are connected with each other at somewhere therein, inductance for a current through the first wiring, the fourth wiring, the fifth wiring and to the second wiring is equal to inductance for a current through the third wiring, the sixth wiring, the fifth wiring and to the second wiring.

12. A structure of wiring connection according to claim 7, wherein each connecting portion of the first wiring to the sixth wiring is detachable from a corresponding connecting portion thereof.

13. A structure of wiring connection according to claim 1, wherein the first wiring and the second wiring are used as internal wirings in an electric device module, and the connecting portion and the elbow portion of the first wiring and those of the second wiring are exposed on a surface of the electric device module.

14. A structure of wiring connection according to claim 13, wherein the connecting portion of the first wiring and that of the second wiring are provided on a surface of a box-like shell of the electric device module, while the electric device module is a power transistor module, a power diode module or an intelligent power module.

15. A structure of wiring connection according to claim 14, wherein the elbow portions continuing each connecting portion of the first wiring and that of the second wiring are provided on the same surface of the box-like shell of the electric device module as that the connecting portions are provided.

16. A structure of wiring connection according to claim 14, wherein the elbow portions continuing each connecting portion of the first wiring and that of the second wiring are provided on the adjoining surface of the box-like shell of the electric device module to that the connecting portions are provided.

17. A structure of wiring connection according to claim 7, wherein the first wiring to the third wiring are used as internal wirings of the electric device module, and the connecting portion and the elbow portion of the first wiring, those of the second wiring and those of the third wiring are respectively exposed on a surface of the electric device module.

18. A structure of wiring connection according to claim 17, wherein each connecting portion of the first wiring to the third wiring is provided on a surface of the box-like shell of the electric device module, while the electric device module is a power transistor module, a power diode module or an intelligent power module.

19. A method of wiring connection comprising:

preparing first to fourth wirings that respectively extends in extending directions as narrow plates each having two main faces respectively defined by each extending direction and a direction crossing thereto to have a predetermined plate width, and in each extending direction, provided with a main portion, at least one connecting portion and an elbow portion defined as a portion between the main portion and the connecting portion thereof, connecting the connecting portion of the first wiring and the connecting portion of the third wiring so as to be in contact with each other through a predetermined area; and connecting the connecting portion of the second wiring and the connecting portion of the fourth wiring so as to be in contact with each other through a predetermined area, wherein between any one of the first wiring to the fourth wiring and one of the other wirings, a specific distance defined as a distance between gravity centers in sections of two corresponding wirings of the first wiring to the fourth wiring cut along a plane vertical to each main face of the two corresponding wirings is less than the predetermined plate width of each of the two corresponding wirings, and wherein the main portion of the first wiring and the main portion of the second wiring run together in parallel facing each one of main faces thereof, and the main portion of the third wiring and the main portion of the fourth wiring run together in parallel facing each one of main faces thereof.

* * * * *